United States Patent
Coleman et al.

(10) Patent No.: US 11,170,096 B2
(45) Date of Patent: Nov. 9, 2021

(54) CONFIGURABLE INTERNET ISOLATION AND SECURITY FOR MOBILE DEVICES

(71) Applicant: L3 Technologies, Inc., New York, NY (US)

(72) Inventors: Glenn Coleman, Berwyn, PA (US); Peter Martz, Marlton, NJ (US); Kenneth Moritz, Lansdowne, PA (US)

(73) Assignee: L3 Technologies, Inc., New York, NY (US)

( * ) Notice: Subject to any disclaimer, the term of this patent is extended or adjusted under 35 U.S.C. 154(b) by 135 days.

(21) Appl. No.: 16/163,884

(22) Filed: Oct. 18, 2018

(65) Prior Publication Data

US 2019/0121962 A1    Apr. 25, 2019

Related U.S. Application Data

(60) Provisional application No. 62/575,757, filed on Oct. 23, 2017.

(51) Int. Cl.
*G06F 21/53* (2013.01)
*H04L 29/06* (2006.01)
(Continued)

(52) U.S. Cl.
CPC .......... *G06F 21/53* (2013.01); *H04L 63/0263* (2013.01); *H04L 63/0281* (2013.01);
(Continued)

(58) Field of Classification Search
CPC ............ G06F 21/53; G06F 2221/2149; H04L 63/0263; H04L 63/0281; H04L 63/0853; H04L 67/12; H04L 67/34
(Continued)

(56) References Cited

U.S. PATENT DOCUMENTS 7,150,040 B2    12/2006  Brownell
7,467,408 B1    12/2008  Otoole, Jr.
(Continued)

FOREIGN PATENT DOCUMENTS

RU    2406138 C1    12/2010

OTHER PUBLICATIONS

Young, An Architecture for Virtualization-Based Trusted Execution Environment on Mobile Devices, IEEE, 978-1-4799,7646-1/1/14, 2014, 540-547) (Year: 2014).*

(Continued)

*Primary Examiner* — Peter C Shaw
(74) *Attorney, Agent, or Firm* — Condo Roccia Koptiw LLP

(57) ABSTRACT

Systems, methods, and instrumentalities are disclosed for providing configurable and customizable internet isolation and security schemes for a mobile device. A mobile device (e.g., a cell phone, smart phone, tablet, Internet of Things (IoT) device, etc.) may include a processor and a memory. The mobile device may be configured to implement a workspace and an isolated computing environment. The workspace may enable operation of a set of applications (e.g., trusted applications) via a memory space (e.g., a trusted memory space). The isolated computing environment may enable operation of a set of one or more applications (e.g., untrusted applications) via a memory space (e.g., an untrusted memory space). The untrusted applications may include, for example, one or more of an Internet browser, an email application, a document editing application, or a social media application. The untrusted applications may communicate with one or more untrusted network destinations via a network.

20 Claims, 5 Drawing Sheets

(51) Int. Cl.
    *H04L 29/08* (2006.01)
    *H04W 12/06* (2021.01)
    *H04W 12/088* (2021.01)
(52) U.S. Cl.
    CPC ........ *H04L 63/083* (2013.01); *H04L 63/0853* (2013.01); *H04L 67/12* (2013.01); *H04L 67/125* (2013.01); *H04L 67/34* (2013.01); *H04W 12/06* (2013.01); *H04W 12/088* (2021.01); *G06F 2221/2149* (2013.01)
(58) Field of Classification Search
    USPC .......................................................... 726/3
    See application file for complete search history.

(56) References Cited

U.S. PATENT DOCUMENTS

| | | | |
|---|---|---|---|
| 7,478,330 B1 | 1/2009 | Branson et al. | |
| 7,694,328 B2 | 4/2010 | Joshi et al. | |
| 7,698,442 B1 | 4/2010 | Krishnamurthy et al. | |
| 7,716,720 B1* | 5/2010 | Marek | G06F 21/74 726/2 |
| 7,805,516 B2 | 9/2010 | Kettler et al. | |
| 7,870,153 B2 | 1/2011 | Croft et al. | |
| 7,926,086 B1 | 4/2011 | Violleau et al. | |
| 8,090,797 B2 | 1/2012 | Chinta et al. | |
| 8,539,561 B2 | 9/2013 | Pingali et al. | |
| 8,566,398 B2 | 10/2013 | Barnier et al. | |
| 8,613,070 B1 | 12/2013 | Borzycki et al. | |
| 8,769,268 B2 | 7/2014 | Morozov et al. | |
| 8,931,054 B2 | 1/2015 | Huynh et al. | |
| 8,966,464 B1 | 2/2015 | Christopher et al. | |
| 9,294,492 B1* | 3/2016 | Martini | H04L 63/145 |
| 9,386,021 B1 | 7/2016 | Pratt | |
| 9,438,634 B1 | 9/2016 | Ross et al. | |
| 9,465,734 B1 | 10/2016 | Myrick et al. | |
| 9,531,715 B1 | 12/2016 | Rodgers et al. | |
| 9,602,524 B2 | 3/2017 | Ghosh et al. | |
| 9,609,026 B2 | 3/2017 | Ross et al. | |
| 9,680,873 B1 | 6/2017 | Halls et al. | |
| 9,729,579 B1 | 8/2017 | Marino et al. | |
| 9,787,639 B1 | 10/2017 | Sun et al. | |
| 9,864,600 B2 | 1/2018 | Larimore et al. | |
| 9,921,860 B1 | 3/2018 | Banga et al. | |
| 9,942,198 B2 | 4/2018 | Hoy et al. | |
| 10,037,199 B2 | 7/2018 | Hung et al. | |
| 10,055,231 B1 | 8/2018 | Li et al. | |
| 10,122,703 B2 | 11/2018 | Innes et al. | |
| 10,397,273 B1 | 8/2019 | Stickle et al. | |
| 10,521,612 B2 | 12/2019 | Arad et al. | |
| 10,554,475 B2 | 2/2020 | Weinstein et al. | |
| 10,558,798 B2 | 2/2020 | Weinstein et al. | |
| 10,931,669 B2 | 2/2021 | Coleman et al. | |
| 2002/0023212 A1 | 2/2002 | Proudler | |
| 2002/0040439 A1 | 4/2002 | Kellum | |
| 2002/0069366 A1 | 6/2002 | Schoettger | |
| 2002/0069369 A1 | 6/2002 | Tremain et al. | |
| 2005/0144467 A1 | 6/2005 | Yamazaki | |
| 2006/0070066 A1 | 3/2006 | Grobman | |
| 2006/0282795 A1 | 12/2006 | Clark et al. | |
| 2007/0136579 A1 | 6/2007 | Levy et al. | |
| 2007/0220187 A1 | 9/2007 | Kates | |
| 2007/0260873 A1 | 11/2007 | Hatfalvi et al. | |
| 2008/0016313 A1* | 1/2008 | Murotake | H04L 63/02 711/173 |
| 2008/0028401 A1 | 1/2008 | Geisinger | |
| 2008/0201711 A1 | 8/2008 | Amir Husain | |
| 2008/0256536 A1 | 10/2008 | Zhao et al. | |
| 2009/0055924 A1 | 2/2009 | Trotter | |
| 2009/0164994 A1 | 6/2009 | Vasilevsky et al. | |
| 2009/0172781 A1 | 7/2009 | Masuoka et al. | |
| 2009/0249472 A1 | 10/2009 | Benjamini et al. | |
| 2009/0328038 A1 | 12/2009 | Yamada et al. | |
| 2010/0138829 A1 | 6/2010 | Hanquez et al. | |
| 2010/0138830 A1 | 6/2010 | Astete et al. | |
| 2010/0223613 A1 | 9/2010 | Schneider | |
| 2010/0251329 A1 | 9/2010 | Wei | |
| 2011/0154431 A1 | 6/2011 | Walsh | |
| 2011/0299515 A1 | 12/2011 | Robertson et al. | |
| 2012/0017213 A1 | 1/2012 | Hunt et al. | |
| 2012/0023593 A1 | 1/2012 | Puder et al. | |
| 2012/0054744 A1 | 3/2012 | Singh et al. | |
| 2012/0265976 A1 | 10/2012 | Spiers et al. | |
| 2013/0145463 A1 | 6/2013 | Ghosh et al. | |
| 2013/0318594 A1 | 11/2013 | Hoy et al. | |
| 2014/0040979 A1 | 2/2014 | Barton et al. | |
| 2014/0059642 A1 | 2/2014 | Deasy et al. | |
| 2014/0075535 A1 | 3/2014 | Softer et al. | |
| 2014/0108558 A1 | 4/2014 | Borzycki et al. | |
| 2014/0115646 A1 | 4/2014 | Rajgopal et al. | |
| 2014/0282890 A1 | 9/2014 | Li et al. | |
| 2014/0344912 A1* | 11/2014 | Chapman, II | H04L 63/1441 726/11 |
| 2014/0351516 A1 | 11/2014 | Larimore et al. | |
| 2015/0156203 A1 | 6/2015 | Giura et al. | |
| 2015/0281176 A1 | 10/2015 | Banfield | |
| 2016/0057167 A1 | 2/2016 | Bach | |
| 2016/0226834 A1 | 8/2016 | Dawson | |
| 2016/0246974 A1 | 8/2016 | Broz et al. | |
| 2016/0248754 A1 | 8/2016 | Jahr | |
| 2016/0292694 A1 | 10/2016 | Goldschlag et al. | |
| 2017/0034174 A1 | 2/2017 | Jägers | |
| 2017/0076092 A1 | 3/2017 | Kashyap et al. | |
| 2017/0142144 A1 | 5/2017 | Weinberger et al. | |
| 2017/0180413 A1 | 6/2017 | Petry et al. | |
| 2017/0206351 A1 | 7/2017 | Jay et al. | |
| 2017/0208067 A1 | 7/2017 | Sriramakrishnan | |
| 2017/0250997 A1 | 8/2017 | Rostamabadi | |
| 2017/0317978 A1 | 11/2017 | Diaz-Cuellar et al. | |
| 2017/0353496 A1 | 12/2017 | Pai et al. | |
| 2017/0359309 A1 | 12/2017 | Bolte et al. | |
| 2018/0027006 A1 | 1/2018 | Zimmermann et al. | |
| 2018/0115519 A1 | 4/2018 | Bonomi et al. | |
| 2018/0139178 A1 | 5/2018 | Gan | |
| 2018/0196945 A1 | 7/2018 | Kornegay et al. | |
| 2018/0198824 A1 | 7/2018 | Pulapaka et al. | |
| 2018/0203995 A1 | 7/2018 | Yuen et al. | |
| 2018/0234422 A1 | 8/2018 | Odom et al. | |
| 2018/0276396 A1 | 9/2018 | Yablokov et al. | |
| 2018/0330257 A1 | 11/2018 | Dodson et al. | |
| 2018/0367528 A1 | 12/2018 | Schwarz et al. | |
| 2019/0097970 A1 | 3/2019 | Coleman et al. | |
| 2019/0097972 A1 | 3/2019 | Coleman et al. | |
| 2019/0098007 A1 | 3/2019 | Coleman et al. | |
| 2019/0098020 A1 | 3/2019 | Martz et al. | |
| 2019/0121961 A1 | 4/2019 | Coleman et al. | |
| 2019/0121962 A1 | 4/2019 | Coleman et al. | |
| 2019/0213325 A1* | 7/2019 | McKerchar | G06F 21/53 |

OTHER PUBLICATIONS

Kostiainen et al., "Dedicated Security Chips in the Age of Secure Enclaves", IEEE, doi: 10.1109/MSEC.2020.2990230, pp. 38-46, Sep.-Oct. 2020. (Year: 2020).*

Jauernig et al., "Trusted Execution Environments: Properties, Applications, and Challenges", IEEE, doi: 10.1109/MSEC.2019.2947124, pp. 56-60, Mar.-Apr. 2020. (Year: 2020).*

Barnet, Mark, "Praktikum Po Zaschite Seti Kompanii", Windows IT Pro/RE, Nov.-Dec. 2006, 4 pages.

Burnett, Mark, "How I Secured One Company's Network", Using Log Parser, Virtualization, and a Little Psychology, Sep. 17, 2006, 4 pages.

Laverick, Mike, "Hypervisor Management and Optimization for Advanced Virtualization", Advanced Virtualization E-Book, 2010, 13 pages.

Li et al., "VSITE: A Scalable and Secure Architecture for Seamless L2 Enterprise Extension in the Cloud", 6th IEEE Workshop on Secure Network Protocols, Kyoto, Oct. 2010, pp. 31-36.

Reuben, Jenni Susan, "A Survey on Virtual Machine Security", TKK T-110.5290 Seminar on Network Security, Oct. 11-12, 2007, 5 pages.

(56) References Cited

OTHER PUBLICATIONS

Villeneuve, Nart, "Command and Control in the Cloud", Malware Explorer, Oct. 22, 2010, 3 pages.
Wikipedia, "Computer Networking", Available at https://en.wikipedia.org/wiki/Computer_network, Dec. 2010, 19 pages.
Wikipedia, "Computer Security", Available at https://en.wikipedia.org/wiki/Computer_security, retrieved on Dec. 2010, 27 pages.
Wikipedia, "Cyber Security Standards", Available at https://en.wikipedia.org/wiki/Cyber_security_standards, retrieved on Dec. 2010, 9 pages.
Wikipedia, "HTTP Secure", Available at https://en.wikipedia.org/wiki/HTTPS, retrieved on Dec. 2010, 9 pages.
Wikipedia, "Hypervisor", Available at https://en.wikipedia.org/wiki/Hypervisor , retrieved on Dec. 2010, 6 pages.
Wikipedia, "Internet Protocol", Available at https://en.wikipedia.org/wiki/Internet_Protocol, retrieved on Dec. 2010, 5 pages.
Wikipedia, "Multiprotocol Label Switching", Available at https://en.wikipedia.org/wiki/Multiprotocol_Label_Switching , retrieved on Dec. 2010, 8 pages.
Wikipedia, "Network Address Translation", Available at https://en.wikipedia.org/wiki/Network_address_translation, Dec. 2010, 12 pages.
Wikipedia, "Security-Focused Operating System", Available at https://en.wikipedia.org/wiki/Security-focused_operating_system, retrieved on Dec. 2010, 9 pages.
Wikipedia, "Virtual Desktop", Available at https://en.wikipedia.org/wiki/Virtual_desktop, retrieved on Dec. 2010, 5 pages.
Wikipedia, "Virtual Private Network", Available at https://en.wikipedia.org/wiki/Virtual_private_network, retrieved on Dec. 2010, 9 pages.
Bruckman, Amy, et al., ""Georgia Computes!": Improving the Computing Education Pipeline", Proceeding of the 40th ACM technical symposium on Computer Science Education, 2009, pp. 86-90.
Phuoc Le, Huu, et al., "Computing the Real Isolated Points of an Algebraic Hypersurface", International Symposium on Symbolic and Algebraic Computation, Jul. 2020, pp. 297-304.
"NPL Search Term", Web Search History, 1 page.
Azab, et al., "SICE: A Hardware-Level Strongly Isolated Computing Environment for x86 Multi-Core Platforms", Proceedings of the 18th ACM Conference on Computerand Communications Security, Oct. 2011, pp. 375-388.
Comodo, "Comodo Internet Security", Software Version 7.0, User Guide Version 7.0.111114, 2014, pp. 1-579.
Gupta, et al., "A Secure Architecture Design Based on Application Isolation, Code Minimization and Randomization", IEEE 6th Symposium on Security Analytics and Automation 2013, 2013, pp. 423-429.
Haq, et al., "Design and Implementation of Sandbox Technique for Isolated Applications", IEEE School of Computer Science and Technology, Beijing Institute of Technology, Beijing, China, 2016, pp. 557-561.
Hsu, et al., "Enforcing Least Privilege Memory Views for Multithreaded Applications", Proceedings of the 2016 ACM SIGSAC Conference on Computerand Communications Security, Oct. 2016, pp. 393-405.
Liu, et al., "Thwarting Memory Disclosure with Efficient Hypervisor-Enforced Intra-Domain Isolation", Proceedings of the 22nd ACM SIGSAC Conference on Computer and Communications Security, Oct. 2015, pp. 1607-1619.
Srivastava, et al., "Tamper-Resistant, Application-Aware Blocking of Malicious Network Connections", School of Computer Science, Georgia Institute of Technology, 2008, pp. 39-58.
Yadav, et al., "Impact & Analysis of Virtual Workspace on Grid Computing", International Journal of Science & Technology (IJST), vol. 2, Issue 2, Apr. 2012, pp. 24-32.
Yee, et al., "Native Client: A Sandbox for Portable, Untrusted x86 Native Code", 2009 30th IEEE Symposium on Security and Privacy, 2009, pp. 79-93.

* cited by examiner

CONFIGURABLE INTERNET ISOLATION AND SECURITY FOR MOBILE DEVICES

CROSS-REFERENCE TO RELATED APPLICATION

This application claims the benefit of U.S. Provisional Application Ser. No. 62/575,757, filed Oct. 23, 2017, the contents of which are incorporated by reference herein.

BACKGROUND

The Internet provides access to a large number of systems from which beneficial and/or harmful data may be retrieved by a mobile device attached to and communicating over the Internet. Harmful data that can be accessed through the Internet includes a variety of viral software constructs, generally referred to as malicious software or malware. Malware may be downloaded to a mobile device, such as a mobile device, unintentionally, for example, by and/or without the knowledge of the user of the mobile device.

A mobile device that has downloaded malware may be referred to as an infected mobile device. An infected mobile device may result in possible security losses, reduction of efficiency, and/or malfunctions. Security losses may include, but are not limited to, the loss of some or all data that is accessible by the infected mobile device, the installation of additional malware onto the infected mobile device, and/or the loss of command and control of the infected mobile device. Reduction of efficiency may be incurred from, but not limited to, additional processor demand, additional memory usage, and/or additional network access by the executing malware.

The security and privacy of the user of the infected mobile device may be compromised by malware. Both information located on the infected mobile device and/or information stored on or communicated via a local area network may be susceptible to attack by the malware. In many instances, an infected host computer may be used by the malware as a vehicle to stage an attack on other network resources that are accessible from the infected mobile device. In the case of attacks on mobile devices, such an attack method is often undetected by the user of the mobile device and/or the operator of the cellular network on which it operates.

An infected mobile device may lose command and control. The loss of command and control of the infected mobile device may include performing one or more actions the author of the downloaded malware may desire. For example, the malware may perform a reconnaissance of the infected mobile device, determine system privileges, access local files, access security tokens, and/or attempt infection or access of other network resources accessible from the infected computer system. Given that mobile devices now include access and store large amounts of personal and financial information, such command and control attacks could have severe impacts on the use of the mobile device.

SUMMARY OF THE INVENTION

Systems, methods, and instrumentalities are disclosed for providing configurable and customizable internet isolation and security schemes for a mobile device. A mobile device (e.g., a cell phone, smart phone, tablet, Internet of Things (IoT) device, etc.) may include a processor and a memory. The mobile device may be configured to implement a workspace and an isolated computing environment. The workspace may enable operation of a set of applications (e.g., trusted applications) via a memory space (e.g., a trusted memory space). The isolated computing environment may enable operation of a set of one or more applications (e.g., untrusted applications) via a memory space (e.g., an untrusted memory space). The untrusted applications may include, for example, one or more of an Internet browser, an email application, a document editing application, or a social media application. The untrusted applications may communicate with one or more untrusted network destinations via a network. The network may be, for example, one or more of a local area network (LAN), a wide area network (WAN), a cellular network, a Wi-Fi network, a digital subscribers line (DSL) network, a cloud computing network, a data center, or a satellite network.

The memory may include one or more (e.g., two) memory chips. The trusted memory space and the untrusted memory space may be located on different memory chips. The isolated computing environment and the workspace may be configured on the mobile device, for example, during manufacturing, sale, or prior to delivery of the mobile device.

The workspace may be isolated from the isolated computing environment by the use of an internal firewall (e.g., an internal isolation firewall). The internal firewall may prompt a user of the mobile device to allow communication between the workspace and the isolated computing environment. The workspace and the isolated computing environment may be isolated from the network by the use of a host-based firewall. The host-based firewall may allow one or more incoming communications from the network that are sent to the isolated computing environment, and/or block one or more incoming communications from the network that are sent to the workspace. For example, the host-based firewall may block communications from the untrusted network destinations to the workspace. For example, the host-based firewall may allow the trusted applications to communicate with one or more trusted destinations (e.g., trusted network destinations).

The untrusted applications may authenticate with an authentication device (e.g., a proxy server) in order to communicate with the untrusted network destinations. For example, the authentication device may be a proxy server, and the untrusted applications may communicate with the untrusted network destinations via the proxy server. There may be one or more (e.g., two) authentication devices. The mobile device may select an authentication device to use based on, for example, the identity of the network.

The user of the mobile device may download an application onto the mobile device. The mobile device may prompt the user to select whether to execute the application in the first memory space or the second memory space. For example, the user may store the application in the first memory space, and the application may be launched in the workspace. The user may move an application from the first memory space to the second memory space and/or vice versa.

The isolated computing environment may include one or more (e.g., two) sandboxed computing environments. For example, the isolated computing environment may be subdivided into a first sandboxed computing environment and a second sandboxed computing environment. The first and second sandboxed computing environments may be configured to each run a subset (e.g., one or more) of the untrusted applications. For example, an Internet browser may run in the first sandboxed computing environment and an email application and a social media application may run in the second sandboxed computing environment. The first and second sandboxed computing environments may have one or more different settings. For example, the host-based firewall may be configured to allow one or more communications from the network to the first sandboxed computing environment, but block the same communications from the network to the second sandboxed computing environment. The mobile device may prompt the user to select whether to run an application in the first sandboxed computing environment or the second sandboxed computing environment. The internal isolation firewall may be configured to prompt the user of the mobile device to allow communication between the first and second sandboxed computing environments.

In examples, the mobile device may be a mobile device such as a cell phone, personal digital assistance (PDA), tablet, an Internet of Things (IoT) device, and/or the like. The internet isolation system may be installed on a mobile device. For example, the internet isolation system may be installed on a device at or during the time of manufacture and/or sale of the mobile device. The internet isolation system may be integrated with and/or partially implemented within a network to which the mobile device is connected and on which the mobile device operates. For example, certain aspects of the internet isolation system, such as the use of one or more containers configured to isolate certain applications and/or the configurations of certain firewalls to prevent certain types of communications, may be implemented on the mobile device, while other aspects of the internet isolation systems, such as a web proxy or other network based firewalls, may be implemented within a network to which the mobile device is connected.

The internet isolation system may be pre-installed on the mobile device by the device manufacturer with a generic configuration and/or a network (e.g, cellular, wireless, etc) specific configuration. Upon delivery to a user, the generic internet isolation system may be configured with specific rules tailored to the needs and/or subscriptions of the user. For example, the configuration may include identifying which applications installed on the mobile device should be isolated in the computer system using a container and/or virtual machine (e.g., a browser, an email application, a peer-to-peer communication application, etc.), identifying which addresses or sites may be accessed from outside an isolated computing system environment (e.g., from outside a container or virtual machine), identifying which addresses or sites may not be accessed from outside an isolated computing system environment (e.g., from outside a container or virtual machine), configuring proxy settings and devices for the isolated computing system environment(s), configuring authentication credentials for the isolated computing system environment(s), and/or the like.

In an example, the internet isolation system may be a downloadable application that is installed on the mobile device. For example, the user may be allowed to select and download an internet isolation app for the mobile device from a third party app provider and/or via the application store of the device manufacturer/operating system manufacturer (e.g., the Apple App store, Google Play, etc.). Upon downloading the internet isolation app, the user may configure the internet isolation app according to a desired security level. For example, the user may identify which other applications installed on the mobile device should be isolated in the computer system using a container and/or virtual machine (e.g., a browser, an email application, a peer-to-peer communication application, etc.), identification of which addresses or sites may be accessed from outside an isolated computing system environment (e.g., from outside a container or virtual machine), identification of which addresses or sites may not be accessed from outside an isolated computing system environment (e.g., from outside a container or virtual machine), proxy settings for the isolated computing system environment(s), and/or the like.

An example mobile device on which the internet isolation application may be installed may include a processor and a memory. The mobile device may include a first memory space and a second memory space. The first memory space may be configured to enable storage and operation of a workspace configured to execute a first set of one or more applications and processes running on an operating system of the mobile device.

The second memory space may be configured to enable storage and operation of a second set of one or more applications and processes associated with a first sandboxed computing environment configured to run on the operating system. The second set of one or more applications and processes may be configured such that they are allowed to access one or more untrusted sites from the first sandboxed computing environment. Which applications or processes are executed in the second memory space (e.g., the sandbox memory space) may be configurable by the user, and/or may be pre-programed by the manufacturer, seller and/or supplier. Examples of applications that may be configured to be operated in the first sandboxed computing environment may include browsers, email applications, collaborative software, file sharing applications, social media applications, and/or other applications that commonly communicate via the Internet. The first sandboxed computing environment may be enforced via a first sandbox container process. The first sandbox container process may segregate the workspace associated with the first memory space from the first sandboxed computing environment associated with the second memory space. The first sandbox container process may be configured to prevent data from being communicated between the sandboxed computing environment and the workspace without an explicit user input.

The mobile device may include a first firewall. The first firewall may be configured to operate between the workspace of the first memory space and a network. The first firewall may be configured to prevent unauthorized communication between the first set of one or more applications and processes and one or more network destinations. The mobile device may be configured to connect to a trusted network and/or an untrusted network. For example, the trusted network may include a cellular communication network. The first firewall may be configured based on whether the mobile device is connected to the trusted network or the untrusted network (e.g., a public WiFi network). The configurations associated with the first firewall when connected to a trusted or untrusted computer network may be configurable by the end user and/or may be pre-programed by the manufacturer, seller and/or supplier.

The mobile device may determine whether a connected network is known or associated with a predetermined security policy. When the connected network is determined to be known and/or associated with the predetermined security policy, the mobile device may instantiate the predetermined security policy configuration, for example, that is associated with the connected network. The predetermined security policy configuration may include a specific authentication mechanism and/or a specific encryption scheme. The mobile device may be configured to determine whether a connected network is known and/or trusted or untrusted based on one or more of connectivity with a specific device or multiple devices, a unique local area network addressing, and/or other network identification techniques.

The mobile device may include a second firewall. The second firewall may be configured to operate between the first sandboxed computing environment and the workspace. The second firewall may be configured to enforce separation of the first memory space and the second memory space. The mobile device may be configured to enable a third memory space. The third memory space may be configured to enable storage and operation of a third set of one or more applications and processes associated with a second sandboxed computing environment configured to run on the operating system. The third set of one or more applications and processes may be configured to run a second set of one or more applications. Multiple containers (e.g., multiple memory spaces isolated from each other) may be used, for example, where isolation between different apps running on the mobile device is desired. For example, there may be multiple browsers running on the mobile device, and each browser may be isolated in a distinct memory space. In an example, a first memory space and a first container may be used for a browser application and a second memory space and a second container may be used for a second application, such as an email application.

A sandbox container process may be configured to determine if a process operating in the workspace is attempting to access a trusted network destination or an untrusted network destination. When the process operating in the workspace is attempting to access an untrusted network destination, the first sandbox container process may be configured to spawn an instance of the process in the first sandboxed computing environment, for example, to access the untrusted network destination. The first sandbox container process may be configured to determine if a process operating within the first sandboxed computing environment is attempting to access a trusted network destination or an untrusted network destination. When the process is attempting to access a trusted network destination, the first sandbox container process may be configured to spawn an instance of the process in the workspace, for example, to access the trusted network destination.

The first and/or second sandbox container processes may be configured to authenticate with one or more intermediate devices. For example, the first and/or second sandbox container processes may authenticate with the one or more intermediate devices using one or more credentials stored in a configuration file. The configuration file may be associated with the first and/or second sandbox container processes. The one or more intermediate devices may include a termination device and/or a proxy device (e.g., such as a network-based web proxy, an internet-based web proxy, and/or the like). Upon authenticating with the one or more intermediate devices the second and/or third set of applications and/or processes operating within the first and/or second sandboxed computing environments may be allowed to access one or more network destinations via the one or more intermediate devices.

DETAILED DESCRIPTION

Figure 1:
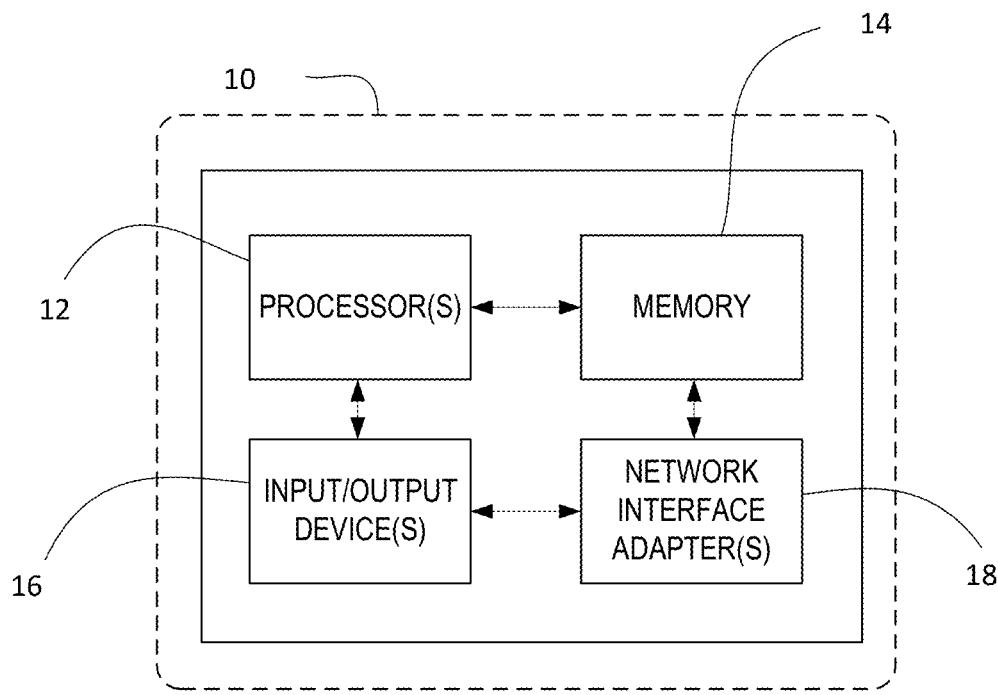
FIG. 1 depicts an example mobile device.

Methods and systems are disclosed for internet isolation and security schemes for a mobile device. In examples, the mobile device may be a mobile device such as a cell phone (e.g., or similar mobile computing device, such as but not limited to, a tablet, a home automation device, personal electronics with wired or wireless communication capabilities, cloud enabled devices, IoT device, etc.) having an internet isolation system. The internet isolation system may include one or more segregated memory spaces, a monitoring process, one or more internal isolation firewalls, an automated authentication mechanism, a host-based firewall, a document isolation capability, a location awareness capability, and/or a browser switching function. The internet isolation system may be installed on a mobile device such as, but not limited to, a smartphone or tablet.

For example, the internet isolation system may be installed (e.g., preinstalled) on a mobile device at or during the time of manufacture, sale and/or prior to delivery. The internet isolation system may be pre-configured with a generic configuration by the manufacturer, seller, and/or supplier of the mobile device. The internet isolation system may be pre-configured with a generic configuration on a mobile device as default by a network operator (e.g., a cellular network operator) for use on the operator's network. The internet isolation system may be pre-configured with a specific configuration by the manufacturer, seller, and/or supplier of the mobile device as selected by (e.g., directed by) the consumer, seller and/or supplier. A consumer may have an option to preinstall the internet isolation system onto the mobile device. If the internet isolation system is preinstalled by a manufacturer, seller, and/or supplier of the mobile device, the mobile device may be referred to a secure mobile device. For another example, a consumer may custom-install the internet isolation system. A customer may have an option to select one or more (e.g., all) of capability in the internet isolation system to be installed on a mobile device. The selective installation may allow the consumer a flexibility to select and/or tailor the internet isolation system to fit the customer's budget and/or preferences. For another example, the internet isolation system may be an aftermarket component, such as a single application and/or application suite. The internet isolation system may be an endpoint protection scheme configured to protect one or more mobile devices and the network to which the mobile devices are connected.

The mobile device may include use of an authentication mechanism with an intermediate device (e.g., an authentication device). The intermediate device may be a web proxy, a termination device, another proxy device, and/or the like. The intermediate device may be a gateway or node within the core network of a network to which the mobile device is connected. The mobile device may use an authentication scheme to connect with the intermediate device. The authentication scheme may use an encryption scheme as a means to obfuscate the authentication methods or credentials. The internet isolation system may enable multiple authentication and/or encryption schemes. In examples, the authentication mechanism and/or the encryption scheme may be preinstalled on a mobile device (e.g., as a part of the internet isolation system) to provide a consumer better protection and a secure out-of-the box mobile device. There may be one or more (e.g., two) intermediate devices available to the mobile device. The mobile device may be configured to select an intermediate device based on, for example, an identity of the network to which the mobile device is connected.

The terms "intermediate device" and "authentication device" may be used interchangeably herein. For example, they may refer to a device that acts as an intermediary for communication between the mobile device and the network. For example, the authentication device may be a proxy (e.g., a proxy server), and the mobile device may communicate with the network via the proxy. The mobile device may be configured to authenticate with the authentication device in order to communicate with the network.

A mobile device may be configured to dynamically modify the security policy and/or authentication mechanism. For example, the mobile device may dynamically modify the security policy and/or authentication mechanism based on a level of protection required or desired by a consumer, a location of the mobile device, a location of an intermediate device (e.g., such as a web proxy), a type of communication (e.g., such as web-based protocols, file transfers, email, social media applications, gaming applications, video chat applications, instant messaging applications, etc.), and/or the operating system (e.g., such as Apple iOS, Google Android, Microsoft Windows Phone OS, Linux-based, etc.) of the mobile device. The mobile device may have the security policy and/or authentication mechanism software preinstalled. For example, the security policy and/or authentication mechanism may be installed by the manufacture of the mobile device as a part of the internet isolation system. In an example, the authentication mechanism may be pre-installed, but the specific settings utilized for authentication (e.g., credentials, authentication and/or encryption mechanism, associated internet isolation devices and/or settings, etc.) may be configured after delivery. For example, the mobile device may be pre-configured to access a web proxy when attempting to access untrusted destinations (e.g., on the Internet). However, the address of the web proxy, the authentication mechanism utilized, and/or the authentication credentials may be configured by the user after delivery of the mobile device. In an example, the authentication mechanism may be customized for a specific network over which the mobile device will communicate. For example, the proxy settings may be configured for a specific network operator.

The mobile device may include a location awareness capability. The location awareness capability may enable the mobile device to determine whether it is connected to a trusted network or an untrusted network. For example, the mobile device may have a subscription for accessing a certain cellular network and the device may consider that cellular network (or a portion thereof, such as the portion of the network not directly accessible/addressable via the Internet) to be a trusted network. The mobile device may be configured to dynamically adjust the security policy and/or the authentication mechanism based on whether the mobile device is connected to a trusted network or an untrusted network. The device may be preconfigured (e.g., by the manufacturer, seller, and/or supplier) to include the location awareness capability, but the specific definitions of what is considered a trusted or untrusted network may, for example, be configured by the end user upon delivery. For example, the user may configure which networks or subnets are considered trusted networks for purposes of location awareness. In an example, the mobile device may be configured to initially identify all networks as untrusted until the user specifically configures the location awareness capability to identify a specific network or subnet as a trusted network. In an example, control plane communications (e.g., communications used to support cellular network operation, such as measurements, mobility messages, radio configuration messages, etc.) over the cellular network may be considered to be transmitted over a trusted network whereas user plane communication (e.g., communications sent to gateways accessible via the Internet and/or to Internet destinations) may be considered to be transmitted over an untrusted network.

For example, the mobile device may use a first security policy when connected to a trusted network and a second security policy when connected to an untrusted network. The mobile device may determine whether a connected network is known and/or associated with a predetermined security policy. When the connected network is known and/or associated with a predetermined security policy, the mobile device may enable the predetermined security policy configuration, for example, associated with the connected network. When the connected network is unknown, the mobile device may enable a default security policy configuration. A security policy configuration may include one or more of a specific authentication mechanism, a specific encryption scheme, a definition of one or more intermediary devices (e.g., such as a web proxy), a host based firewall policy, and/or the like.

When the internet isolation system is installed on a mobile device (e.g., and/or similar devices), for example by a manufacturer, the installed system may result in improved performance for the mobile device, improved interaction between the features of the computing system, a simplified implementation, a simplified administration and/or configuration, a simplified licensing, a simplified support, and/or more secure communication between the mobile device and other devices or network destinations. Preinstalling the internet isolation system in a mobile device may provide less expensive manufacturing and/or administrative costs. For example, installing the internet isolation system at or during the time of manufacture may utilize hardware components for memory separation and/or process control. Consumers may need less setup and/or modification of the mobile device after purchase. The preinstalled internet isolation system in a mobile device may provide cheaper operating costs. For example, installing the internet isolation system at the time of manufacture may provide identical configurations for multiple devices and may need less setup and/or configuration time for the consumers. The preinstalled internet isolation system may provide additional security to the consumers. For example, the preinstalled internet isolation system may be implemented in a Basic Input Output System environment (e.g., BIOS level) and/or hardware level to provide additional security to the consumers. Additionally, network (e.g. cellular) specific configurations may be implemented or configured at the time of manufacture, purchase, or delivery in order to avoid consumers manually implementing complex security and/or network configurations.

The mobile device may be configured to implement network isolation between one or more untrusted network destinations and the mobile device. The network isolation may be implemented via one or more of a host-based firewall on the mobile device, a border firewall around a portion of the trusted network that includes the mobile device, a web proxy, an internal isolation firewall on the mobile device, and/or a segregation of a trusted memory space and an untrusted memory space. For examples, certain network isolation functions, such as memory space segregation, one or more internal isolation firewalls on the mobile device, and the host-based firewall may be implemented on the mobile device. Other network isolation functions, such as the web proxy and the border firewall, may be implemented by a network operator (e.g., within a core network of the network operator).

Internet isolation, which may be referred to herein as communication isolation, may be provided via memory space segregation. Memory space segregation may include enforcing multiple separate memory spaces on the mobile device. The multiple separate memory spaces may include a trusted memory space, which may additionally be referred to as workspace memory, and one or more untrusted memory spaces. Memory segregation may be accomplished utilizing sandboxed environment technology, virtual machine technology, other similar technologies, and/or a combination of said technologies. For example the installed internet isolation system, preinstalled or otherwise, may utilize one or more sandboxed computing environments.

The terms "sandboxed computing environment" and "isolated computing environment" may be used interchangeably herein. For example, they may refer to a memory space that is isolated (e.g., by use of an internal isolation firewall) from another memory space (e.g., a workspace). Applications running in the isolated computing environment may be able to interact with one or more Internet resources, for example via one or more proxy servers and/or authentication devices. An isolated computing environment may be implemented using a sandbox container and/or other isolation techniques such as a virtual machine. The isolated computing environment may be subdivided into two or more similar (e.g., identical) sandboxed computing environments. The subdivided sandboxed computing environments may have similar (e.g., identical) settings and/or characteristics as the isolated computing environment. For example, the subdivided sandboxed computing environments may differ from the isolated computing environment (e.g., only) in terms of the set of applications running each sandboxed computing environment (e.g., each sandboxed computing environment may run a subset of the applications running in the isolated computing environment).

The sandboxed computing environment may include resources (e.g., a limited set of resources) allocated for operation of a sandbox container process. The sandboxed computing environment may be enforced via the sandbox container process. The sandbox container process may be a security mechanism used to separate the sandboxed computing environment from other applications and/or processes that may be running on a workspace (e.g., a trusted memory space) and/or any other memory space of the mobile device. The sandboxed container process may be configured to enable one or more applications and/or processes (e.g., such as a web browser application and/or process, email application and/or process, etc) being executed within the sandboxed computing environment to access the resources allocated for operation of the sandbox container process. For example, the one or more applications and/or processes being operated within the sandboxed computing environment may be allowed to access memory associated with the sandboxed computing environment. The memory associated with the sandboxed computing environment may be separate from memory that is configured to enable storage and operation of the workspace and/or any other memory space.

One or more processes or applications may operate within a sandboxed computing environment and may be referred to as sandboxed processes or applications and/or untrusted applications. The mobile device may have one or more sandbox protected applications or processes, sandboxed computing environments, and/or one or more internal isolation firewalls, which may additionally be referred to as a sandbox firewall or a sandbox isolation firewall. For example, a browser or email application may wholly or partially be contained in a sandboxed computing environment. When the internet isolation system is preinstalled on a mobile device, the mobile device may be preconfigured by default, as to which applications are to be contained in a sandboxed computing environment and to what extent. For example, the mobile device may have a first type of application configured to be wholly contained in the sandboxed computing environment. The mobile device may have a second type of application configured to be partially contained in the same or a separate sandboxed computing environment as the first type of application. As another example, multiple types of applications may be individually instantiate their own corresponding sandboxed computing environments, for example with respective firewall separation and/or distinct untrusted memory spaces. A user, for example using an app executed on the mobile device, may be allowed to configure or control the number of separate containers/memory spaces used and/or identify which applications are to be run in a container (e.g., sandboxed computing environment). In an example, certain applications, such as a browser used for communicating with untrusted internet destinations, may be preconfigured to be operated with a sandboxed computing environment. Other isolation methods such as operating the applications within a virtual machine may be used.

Sandbox protected application(s) or process(es) may operate within a sandboxed computing environment. If the internet isolation system is preinstalled on a mobile device, the sandbox protected application(s) and/or process(es) may be preconfigured. A consumer may modify the preconfigured sandbox protected application(s) and/or process(es) by adding, removing, and/or updating configurations of the application(s) and/or process(es) after receiving the device. As described herein, if the internet isolation system is installed on a mobile device at or during the time of manufacture, sales and/or delivery, the internet isolation system may utilize hardware components for memory separation and/or sandbox container process control.

The workspace may include one or more processes operating within the operating system that are not restricted by a sandbox container process. The operating system of the mobile device may include a set of resources configured to enable operation of the workspace and the sandbox container process(es).

The sandbox container process may have access to one or more operating systems and/or kernel processes in order to enforce isolation between the workspace associated with the first memory space, the sandboxed computing environment associated with the second memory space, and any additionally defined memory spaces. The sandbox container process may enforce the segregation using techniques such as namespace isolation such that processes running in the sandboxed computing environment in the second memory space are restricted from accessing the first memory space including the workspace and/or other memory spaces (e.g., and vice versa). The sandboxed container process may allow the workspace, the sandboxed computing environment, and/or other memory spaces to share access to the host operating system and host operating resources (e.g., including the kernel and libraries) while enforcing the segregation of the memory spaces accessed by the workspace, the sandboxed computing environment, and/or other memory spaces. In this manner, the sandbox container process may permit isolation of the sandboxed computing environment without requiring the sandboxed computing environment to boot a separate operating system, load separate libraries, etc., which would require separate private memory for those files.

The one or more processes or applications operating within a sandboxed computing environment may be permitted to access untrusted network destinations via an access connection device. The access connection device may be a web proxy, for example. The access connection device may be implemented in a core network of a cellular communication network and or within another trusted local area network (e.g., a trusted WiFi network, a trusted enterprise network, etc.) to which the mobile device is connected. The one or more processes or applications operating within the sandboxed computing environment may connect to the untrusted network destinations as a dedicated network interface device with a specific Internet Protocol (IP) address. The mobile device may maintain a list of untrusted network destinations and/or a list of trusted network destinations. In examples, the mobile device may be preloaded with the list of untrusted network destinations and/or the list of trusted network destinations (e.g., at or during the time of manufacture, sales and/or delivery while installing the isolation internet system). A consumer may modify the list by adding and/or removing a network destination(s) to/from the list of untrusted network destinations and/or the list of trusted network destinations. The list of trusted network destinations may be a whitelist. The list of untrusted network destinations may be a blacklist. The whitelist and the blacklist may be refined based on username and/or machine identification (ID) (e.g. the connected network and/or subnet). For example, the lists of trusted and untrusted network destinations may be different for different users, machines associated with a respective network, and/or different networks. The whitelist and/or the blacklist may be associated with one or more access levels. For example, a first whitelist and a first blacklist may be assigned to a first access level. An untrusted network destination may be an untrusted resource, an untrusted device, an untrusted website, and/or the like. Since the untrusted network destinations may be sources of malware, the one or more processes and/or applications operating within the sandboxed computing environment may be allowed to communicate with the untrusted network destination(s), but other communication from the mobile device (e.g., communications originating from outside the sandboxed computing environment such as from within the workspace) to the untrusted network destination(s) may be prevented.

Communication isolation may be provided via a host-based firewall. The host-based firewall may be configured to prevent unauthorized communication between applications and/or processes operating in the workspace of the mobile device to other devices on the network over which the host computer is communicating. The host-based firewall may be configured to block incoming and/or outgoing communications to the workspace of the mobile device, except for predetermined trusted devices and/or predetermined network ports. Similarly as described herein, the list of predetermined trusted devices and/or predetermined network ports may be preloaded to a mobile device when the isolation internet system is installed, for example at or during the time of manufacture, sales and/or delivery. In an example, the user may configured the mobile device with a list of one or more trusted devices, network ports and/or trusted addresses. The host-based firewall may allow outgoing communications to be sent from a process in the workspace to a trusted network destination/address and/or using a specific network port. The host-based firewall may be configured to block outgoing communications to be sent from a process in the workspace that is not being sent to a trusted network destination/address and/or using a specific network port. In an example, the host-based firewall may allow incoming communications to be received by a process in the workspace sent from a trusted network destination/address and/or using a specific network port. The host-based firewall may block incoming communications to be received by a process in the workspace that is not being sent from a trusted network destination/address and/or using a specific network port. Depending on the implementation, the host-based firewall may implement egress filtering rules (e.g., block certain outgoing traffic based on destination) for communications being sent from the workspace and/or ingress filtering rules (e.g., block certain incoming traffic based on source) for communications being sent to the workspace.

Communication isolation may be provided via an internal isolation firewall. The internal isolation firewall may enable separation between a sandboxed computing environment, the workspace, and/or any other memory spaces. The applications and/or processes operating within the sandboxed computing environment may be prevented from accessing any additional resources of the mobile device. The applications and/or processes operating within the sandboxed computing environment may be prevented from accessing any additional resources of the mobile device without explicit user action. For example, the internal isolation firewall may generate a command prompt that enables a user selection if an application and/or process operating within the sandboxed computing environment is requesting access to resources outside of the sandbox computing environment memory space. By prompting the user to confirm that the applications and/or processes operating within the sandboxed computing environment are permitted to access additional resources outside the sandbox computing environment memory space, malware that is designed to attempt to remain transparent to the user may be limited to operation within the sandboxed computing environment. Thus, the malware within the sandboxed computing environment may be unable to access other resources available to the mobile device generally, such as local area networks and secure memory regions.

An internal isolation firewall may allow certain actions to be performed with approval of the user of the mobile device. For example, an application and/or process operating within the sandboxed computing environment may be allowed access to the mobile device to perform one or more of a cut or copy of data, a paste of data, a printing of data to a local printer, a file transfer, and/or the like. The mobile device may prevent one or more other transfers of data between the sandboxed computing environment and the workspace and/or any other memory space except those user initiated actions described herein. For example, the sandbox container process may prevent unauthorized data transfers between the sandboxed computing environment and the workspace and/or any other memory space.

An internal isolation firewall may be associated with a sandboxed computing environment. In examples, each internal isolation firewall may be configured to prevent any communications (e.g., direct communications) between one or more applications and/or processes in different sandbox computing environments. For example a separate internal isolation firewall may be configured for each of the sandboxed computing environments to segregate the one or more applications and/or processes that operate within each sandboxed computing environment from any other memory spaces and the associated applications and/or processes. In another example, a single internal isolation firewall may be configured to prevent unauthorized communication between isolated memory spaces. For example the internal isolation firewall may implement memory space specific firewall configurations and/or border-specific firewall configurations. For example, the single firewall application be configured to implement a first firewall policy configuration between a first sandbox computing environment and a second sandbox computing environment. The single firewall application may implement a second firewall policy configuration between the first sandbox computing environment and a third sandbox computing environment. The single firewall application may implement a third firewall policy configuration between the first sandbox computing environment and the workspace, etc.

In examples, the internal isolation firewall(s) may be configured to allow communication (e.g., direct communication) between one or more sandbox computing environments and/or the workspace, and one or more of their applications and/or processes, for example via a conduit between the communicating memory spaces. If a sandboxed computing environment determines that a preconfigured allowed list of processes are initiated, the sandbox computing environment may implement a set of rules to allow the communication between one or more sandbox computing environments and/or the workspace, and one or more of their applications and/or processes. The sandboxed computing environment may continue to allow the communication until the one or more applications and/or processes are completed. The sandboxed computing environment may be configured to halt (e.g., temporarily halt) the communication and may resume the communication between the one or more of the sandbox computing environments and/or workspace, and the one or more applications and/or processes.

In examples, the sandbox container process may be configured to provide a firewall interface (e.g., single firewall interface) for one or more (e.g., all) of the sandbox container processes (e.g., internal isolation firewall or internal isolation firewalls associated with the sandboxed applications and/or processes). The firewall interface may be configured to provide an individual internal isolation firewall policy for the (e.g., each of the) sandboxed computing environment. The internal isolation firewall may be configured (e.g., further configured) to allow communication (e.g., direct communication) between one or more sandbox computing environments and/or the workspace, and one or more of their applications and/or processes. The internal isolation firewall may be configured to allow communications between one or more sandbox computing environments and/or the workspace, and one or more of their applications and/or processes one at a time. The internal isolation firewall may be configured to allow communications between one or more (e.g., multiple) sandbox computing environments and/or the workspace, and one or more (e.g., multiple) of their applications and/or processes more than one at a time (e.g., simultaneously). In such cases, the internal isolation firewall may be a hybrid of the examples described herein.

FIG. 1 illustrates an example of a mobile device that may implement one or more applications in a sandboxed environment. For example, a Mobile device 10 may include one or more Processor(s) 12, Memory 14, one or more Input and/or Output (I/O) Devices 16, and one or more Network Interface Adapter(s) 18. Although the examples set forth herein may be described in terms a mobile device such as a smartphone or tablet, the systems and methods disclosed herein may be equally applicable to any computing device or communication device for which internet isolation is desired. For example, the systems and methods disclosed herein may be applicable for providing sandbox based internet isolation for laptops, personal computers (PCs), vehicles, kiosks, facilities, servers, workstations, tablets, smartphones, cell phones, pagers, routers, controllers, microcontrollers, and/or any other processing and/or communication device.

Processor(s) 12 may include one or more of a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGA) circuits, any other type of integrated circuit (IC), a state machine, and/or the like. The Processor(s) 12 may perform data processing, input/output processing, instantiate operating system(s), execute application(s), and/or any other functionality that enables the use of sandbox isolation of one or more applications and/or processes.

Memory 14 may include volatile and/or non-volatile memory. Memory 14 may include read-only memory (ROM), random access memory (RAM), a register, cache memory, semiconductor memory devices, and/or the like. Memory 14 may be configured to store computer readable instructions that when implemented by Processor(s) 12 may cause Processor(s) 12 to implement one or more of the functions or procedures described herein. For example, Memory 14 may be configured to store software code implemented by Processor(s) 12 that instantiate a restricted operating system environment for operation of the sandboxed browser and/or other sandboxed applications(s) and/or process(es). The software may restrict sandbox-based access to one more file descriptors, memory, file system space, etc. For example, the applications and/or processes operating within the sandboxed computing environment may be permitted to certain portions of Memory 14 but may not be allowed access to other portions of Memory 14. As an example, Memory 14 may be partitioned into a first memory space and a second memory space. The first memory space may be configured to enable storage and/or operation of a workspace configured to execute a first set of one or more applications and/or processes running on the operating system of the Mobile device 10. The second memory space may be configured to enable storage and/or operation of a second set of one or more applications and/or processes running within the sandboxed computing environment. The sandboxed computing environment may be enforced via a sandbox container process. The sandbox container process may segregate the workspace associated with the first memory space from the sandboxed computing environment associated with the second memory space. For example, the sandbox container process may include an internal isolation firewall. The internal isolation firewall may enforce the segregation of the first and second memory spaces. A hardware implementation may be configured to restrict sandbox-based access to one or more file descriptors, memory, file system space, etc. as described herein.

The Mobile device 10 may include I/O Device(s) 16. The I/O Devices 16 may include one or more of a screen (e.g., and/or monitor), keyboard, mouse, touchscreen interface, digital camera, a digital display, a graphical user interface, and/or the like. The I/O Device(s) 16 can allow user interaction with the Mobile device 10, for example to allow certain interactions between an application or a process operating within the sandboxed computing environment and non-sandboxed resources.

The Network Interface Adapter(s) 18 may be configured to allow communication between the Mobile device 10 and other devices. The Network Interface Adapter(s) 18 may include one or more wired and/or wireless communication devices.

The sandbox container process may be configured to protect the mobile device from one or more malware toolsets. For example, the Network Interface Adapter(s) 18 may include one or more of a modem, Ethernet adapter, radio, wired and/or wireless transceiver, computer port, network socket, network interface controller, and/or the like. The Processor(s) 12 may maintain rules related to access to the Network Interface Adapter(s) 18 for both access via the sandboxed computing environment and via the workspace. Further, the Processor(s) 12 may enforce a host-based firewall that implements additional rules related to access to the Network Interface Adapter(s) 18.

As described herein, a sandbox protected application or process may be used for communicating with untrusted sources, such as Internet based resources. In this manner, if malware is transferred back to the mobile device due to interactions with the untrusted source, the malware may be isolated to the sandboxed computing environment, which may make it difficult for the malware to infect the workspace of the mobile device. For example, the sandbox container process may prevent the malware toolset from performing a reconnaissance of the mobile device to assess what data is available from the mobile device, such as computing resources, files, network information, additional network connectivity, etc. The sandbox container process (e.g., the internal isolation firewall) may prevent the data on the mobile device from being reported back to the remote device that sent the malware to the host computer and/or any other remote devices.

The sandbox container process may prevent the malware toolset from determining user system privileges of the mobile device, which can be used to access data on any associated network or local area network. For example, applications and/or processes operating within the sandboxed computing environment may not have access and/or authorization to such host computer configurations.

The sandbox container process may prevent the malware toolset from accessing local files stored on the mobile device. For example, the sandbox container process may isolate the first memory space from the second memory space. Such isolation can help prevent the malware from attempting to transmit such information back to the remote device that is the source of the malware. For example, the malware toolset may attempt to transmit a local security database from which additional user credentials can be derived, including potential privileged user credentials. These user credentials may be used by the malware to attempt to gain access to other resources on any associated network or the local area network. Where the user credentials are for a privileged user account, these credentials may be used to gain privileged access to other resources on any associated network or local area network.

The sandbox container process may prevent the malware toolset from accessing a security token and/or hash of the host computer user from the memory of the mobile device and/or a network data stream. This security token or hash can be used to gain access to other resources on any associated network or the local area network. Where the security token or hash is for a privileged user account, this security token or hash may be used to gain privileged access to other resources on any associated network or local area network.

The sandbox container process may prevent the malware toolset from enabling remote control and/or access of the mobile device by a remote device that is unknown to the user. When malware enables remote control and/or access, the remote device may be able to control one or more (e.g., all) operations of an infected mobile device and perform whatever alternative uses that an enslaved, infected mobile device can perform. For example, a remote device may download additional data to an infected mobile device, access other websites for denial of service attacks, and/or convert the infected mobile device into a source of malicious software from which toolsets or secondary payloads are downloaded to other, subsequently infected, mobile devices.

As described herein, the sandbox container process may be installed on a mobile device (e.g., at or during the time of manufacture and/or sales). When the sandbox container process is preloaded on a mobile device, the mobile device may utilize hardware components for memory separation and/or sandbox process control for additional security measures.

Figure 2:
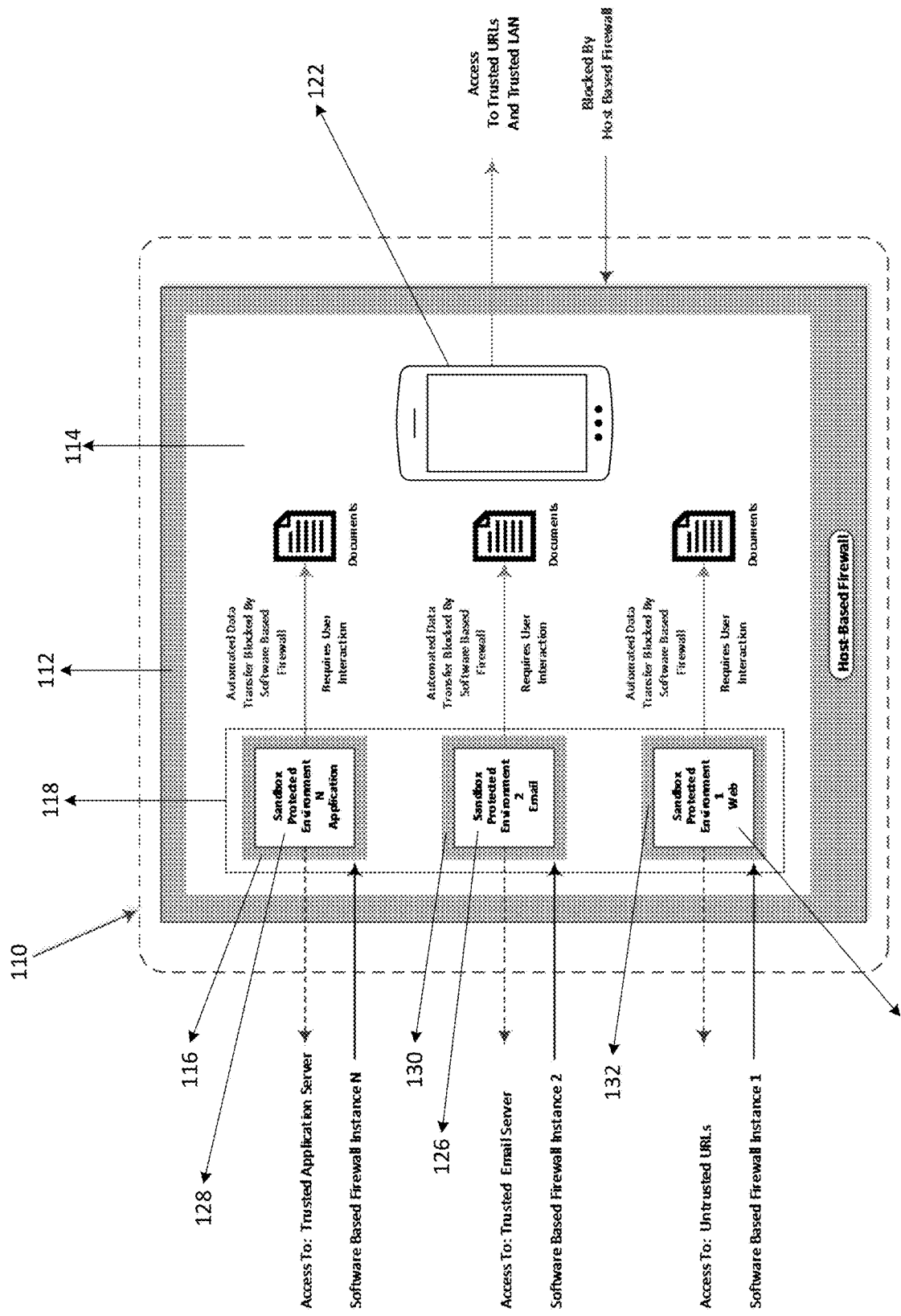
FIG. 2 depicts an example mobile device implementation of an internet isolation system.

FIG. 2 depicts an example mobile device 110 that implements multiple sandboxed computing environments for different applications. For example, the mobile device 110 may include one or more sandboxed computing environments (e.g., as shown by items 120, 126, and 128) or collectively shown as 118 (e.g., memory segregation of an internet isolation system). The collective sandboxed computing environment 118 may be considered an untrusted portion and/or untrusted memory space operating on the mobile device 110. The collective sandboxed computing environment 118 may include one or more sandbox protected computing environments each containing one or more applications and/or processes. The one or more sandbox protected computing environments may have (e.g., may each have) a sandbox container process (e.g., sandbox firewall) as illustrated by 116 for sandbox computing environment 128 (e.g., sandbox firewall 130 for sandbox computing environment 126 and/or sandbox firewall 132 for sandbox computing environment 120).

The mobile device 110 may include a host-based firewall 112, an operating system 122, the collective sandboxed computing environment 118, one or more sandbox computing environments having (e.g., each having) a sandbox container process (e.g., sandbox firewall) as illustrated by 116, 130, and/or 132, and a workspace 114. The mobile device 110 may include an operating system 122 and one or more application programs that run on the operating system 122.

The one or more sandboxed computing environments (e.g., 120, 126, and/or 128) may include one or more resources (e.g., a limited set of resources) allocated to operate a sandbox container process(es). The one or more sandboxed computing environments (e.g., 120, 126, and/or 128), for example, may be (e.g., may each be) enforced via the one or more sandbox container process(es) (e.g., 132, 130, and/or 116, respectively). The sandbox container process(es) may (e.g., may each) be a security mechanism used to separate resources associated with each sandboxed computing environments, for example 120, 126, and/or 128, from other applications and/or processes that may be running in other memory spaces of the mobile device 110, for example the workspace 114. A sandboxed computing environment, such as shown by 120, 126, and/or 128, may (e.g., may each) be configured to enable one or more applications and/or processes (e.g., such as a web browser, email, word processing, and/or the like) being executed within the respective sandboxed computing environment to access the resources allocated for operation of the respective sandbox container process(es). The memory associated with a sandboxed computing environment, for example 126, may be separate from memory that is configured to enable storage and operation of the workspace 114 or any other memory spaces (e.g., other memory spaces associated with other sandboxed computing environments such as 120 and/or 128).

The workspace 114 may include one or more processes operating within the operating system 122. The operating system 122 of the mobile device may include a set of resources configured to enable operation of the workspace 114 and the collective sandbox computing environment 118 and one or more associated applications and/or process(es).

The mobile device 110 may enable, as an example, a first memory space configured to enable storage and/or operation of a workspace 114 configured to execute a first set of one or more applications and/or processes running on an operating system of the mobile device. The workspace 114 may be configured to enable user interaction with the applications and processes running on the operating system 122. In an example, the workspace 114 may be used to operate one or more local applications (e.g., applications that do not access the Internet or infrequently access the Internet) and/or applications deemed to present a relatively small risk of infection from malware.

A second memory space may be configured to enable storage and/or operation of a second set of one or more applications and/or processes. The second memory space may be associated with a first sandboxed computing environment, for example 128 configured to run on the operating system 122. The first sandboxed computing environment (or collective sandboxed computing environment 118) may be configured to access a portion of the operating system 122 resources (e.g., a different portion than the first memory space associated with the workspace of the mobile device 110) and may be disallowed from accessing other operating system 122 resources. For example, a second set of one or more applications and/or processes executed in the second memory space may include a browser process and/or other processes related to browsing the Internet.

A third memory space may be configured to enable storage and/or operation of a third set of one or more applications and/or processes. The third memory space may be associated with a second sandboxed computing environment, for example 126, configured to run on the operating system 122. The second sandboxed computing environment 126 may be configured to access a portion of the operating system 122 resources (e.g., a different portion than the first memory space and/or the second memory space) and may be disallowed from accessing other operating system 122 resources. For example, a third set of one or more applications and/or processes executed in the third memory space may include an email process and/or other processes related to accessing an email system.

Additional memory regions and sandboxed memory spaces may also be implemented for other applications and/or processes. For example, word processing application, file sharing applications, remote desktop applications, video chat applications, system utilities, and/or the like that may be configured to operate within separate memory space(s) associated with additional sandboxed computing environment(s) 120 and/or the like. The types of applications implemented in each sandboxed computing environment, which applications may share a common sandboxed computing environment, and/or the number of sandboxed computing environments may depend on the system configuration. The sandbox memory spaces may be enabled on the mobile device 110 as described herein. Separation and/or isolation of computer resources and/or memory space may be referred to as a virtual air gapped solution. Each memory space may be separate physical memory locations. One or more of the memory spaces may be collocated on a physical memory.

The mobile device 110 may enable the host-based firewall 112. The host-based firewall 112 may prohibit communication (e.g., direct communication) between the mobile device 110 and other devices on the trusted network. The host-based firewall 112 may prohibit communication (e.g., direct communication) between the mobile device 110 and other devices within a trusted computer network. For example, the host-based firewall 112 may be configured to block incoming traffic to the mobile device 110, except for traffic received from one or more predetermined devices and/or ports. One or more devices (e.g., predetermined devices) that are located within a trusted computer network may bypass the host-based firewall 112, for example, using a predetermined set of protocols and/or ports.

The host-based firewall 112 may be implemented using software and/or hardware. For example, the host-based firewall 112 may be implemented using software that is commercially available, for example, such as Symantec Endpoint Protection, MacAfee Host Based Security Systems, etc. The host-based firewall 112 may be implemented using software inherent in the operating system 122 of the mobile device 110, for example the Windows operating system firewall. The host-based firewall 112 may be implemented using software for configuring and/or implementing restrictive ingress and/or egress policies on the mobile device 110.

One or more processes operating within the collective sandboxed computing environment 118 may be prohibited from communicating with other resources within a trusted network. A browser process operating in the sandbox computing environment 120 (e.g., a sandboxed browser) may run within the collective sandboxed computing environment 118. The sandboxed computing environment 120 that is associated with the web browser process may be configured to enable access to untrusted network destinations.

Browser solutions running within the workspace 114 of the mobile device 110 may be utilized for communication between the mobile device 110 and trusted network destinations. For example, browser processes running within the workspace 114 of the mobile device 110 may enable access to the trusted network destinations.

One or more sandbox computing environments, for example 120, 126, and/or 128, of the collective sandboxed computing environment 118 and/or each sandbox container process(es) (e.g., 132, 130, and/or 116, respectively) may be implemented using software and/or hardware. For example, one or more (e.g., each of the) sandbox computing environments, for example 120, 126, and/or 128, of the collective sandboxed computing environment 118 and/or one or more corresponding sandbox container process(es) (e.g., 132, 130, and/or 116, respectively) may be implemented using any combination of software that is commercially available, for example, such as Invincea Endpoint Protection, Tanium Endpoint Platform, Bromium Advanced Endpoint Security, and/or the like.

The one or more sandboxed computing environments (e.g., as shown by 120, 126, and/or 128) may include one or more resources (e.g., a limited set of resources) allocated to operate a sandbox container process(es) (e.g., 132, 130, and/or 116, respectively). The one or more sandboxed computing environments (e.g., 120, 126, and/or 128) may be (e.g., may each be) enforced via the sandbox container process(es) (e.g., 132, 130, and/or 116, respectively). The sandbox container process(es) may (e.g., may each) be a security mechanism used to separate resources associated with each sandboxed computing environments, for example 128 from other applications and/or processes that may be running in other memory spaces, for example 120, 126, and/or the workspace 114. In examples, a single sandbox container process or a group of sandbox container processes may enforce the partitioning of the memory spaces associated with sandboxed computing environments (e.g., 120, 126, and/or 128), for example by applying a respective sandbox firewall policy for each of the sandboxed computing environments (e.g., 120, 126, and/or 128).

A sandboxed computing environment, such as 120, 126, and/or 128, may (e.g., may each) be configured to enable one or more applications and/or processes. For example, the sandbox container process(es) may (e.g., may each) enable a sandbox firewall, such as 116. The sandbox firewall 116, as an example, may enforce a separation of the memory space associated with its sandboxed computing environment 128 and one or more (e.g., all) other memory spaces (e.g., memory spaces associated with other sandbox computing environments, for example 120 and/or 126, and/or the workspace 114). For example, the sandbox firewall 116 may allow a predefined set of processes to be executed within the sandboxed computing environment 128. The sandbox firewall 116, as an example, may prevent execution, in the sandboxed computing environment 128, of any processes outside of the predefined set of processes. The memory space associated with the sandboxed computing environment 128, as an example, may be referred to as a separate and/or isolated memory space. The sandbox container process(es) associated with the sandbox computing environment 128 may be configured to segregate to the memory space, any additional processes, and/or memory usage required for usage of untrusted network destination related content during an established communication session. Separation and/or isolation of computer resources may be referred to as a virtual air gapped solution. Each memory space may be separate physical memory locations. One or more of the memory spaces may be collocated on a physical memory.

Data transfers between each sandboxed computing environment such as shown by 120, 126, and/or 128 and other memory spaces of the mobile device 110 may be restricted to set transfer types. The set transfer types may be configured to minimize the possibility of malicious data migrating between memory spaces of the mobile device 110. A collective sandboxed computing environment 118 (e.g., one or more of the sandbox computing environments, 120, 126, 128 as shown) may transfer (e.g., only transfer) data to or from other memory spaces of the mobile device 110, for example the workspace 114 in response to a user input directing the data transfer. Further, a sandboxed computing environment, for example 120, may transfer (e.g., only transfer) data to or from another sandbox computing environment, for example 126 and/or 128, in response to a user input directing the data transfer. The user input may be an explicit user input such as checking a box and/or selecting a button on an information prompt. The set transfer types that require user input may include one or more manual operations. For example, the set transfer types may include cut or copy of data, paste of data, a printing of data to a local printer, or a file transfer.

In an example, one or more sandbox container process(es) may be configured to allow communication (e.g., direct communication) between one or more other sandbox container environments (e.g., via a conduit between the container processes) and/or the workspace 114.

In another example, the sandbox container process(es) may be configured to have a firewall for one or more (e.g., all) of the sandbox container environments. The firewall may be configured to implement a set of rules (e.g., policies and/or protocols) for each individual sandbox container and/or a group of sandbox containers.

In an example, applications and/or processes being executed in one or more sandboxed container environment(s) may not be permitted any type of direct communication and/or data transfer into one or more other sandbox container environments. Rather, to send data from a first sandbox container environment to a second sandbox container environment, the data may first need to be sent from the first sandbox computing environment to the workspace via a first transfer, then from the workspace to the second sandbox computing environment via a second transfer. Some types of sandbox computing environments may be disallowed from receiving data from other sandbox computing environments and/or from receiving data from the workspace (e.g., enforced via respective sandbox firewall(s)). Transfers from a sandboxed computing environment to the workspace and/or another sandbox computing environment may be limited to a predetermined set of transfer types. Transfers from a sandboxed computing environment to the workspace 114 and/or another sandbox computing environment may require an explicit user input to be initiated.

The operating system 122 may access (e.g., only access) the collective sandboxed computing environment 118 (e.g., one or more of the sandbox computing environments, 120, 126, 128 as shown) as required for the proper operation of each sandboxed computing environment (e.g., 120, 126, and/or 128). The sandbox firewall 116, for example may be built-in with the sandboxed computing environment 128.

A user may initiate a browser process, an email process, and/or other application processes (e.g., word processing) and may enter and/or select a network destination. The mobile device 110 may initiate the one or more processes described herein (e.g., browser process, email process, and/or other application process(es)) in the workspace 114 or a sandboxed computing environment, such as shown by 120, 126, and/or 128. The mobile device 110 may determine whether the network destination is trusted or untrusted. The mobile device 110 may provide access to a trusted network destination via the one or more processes executed in the workspace 114. The mobile device 110 may provide access to an untrusted network destination via one or more of the sandboxed computing environments, such as 120, 126, and/or 128. A sandbox container process(es) (e.g., 132, 130, and/or 116, respectively) may be configured to spawn an application process within the correct environment based on the network destination classification, for example trusted or untrusted.

As an example, a sandbox container process (e.g., 132) may determine that a browser process operating in the workspace 114 is attempting to access an untrusted network destination. A sandbox container process 132 may spawn an instance of a sandboxed browser process in the sandboxed computing environment 120 to provide access to the untrusted network destination. As an example, a sandbox container process (e.g., 132) may determine that the browser process operating in the workspace 114 is attempting to access a trusted network destination. The sandbox container process (e.g., 132) may allow the browser process operating in the workspace 114 to access the trusted network destination.

As another example, the sandbox container process 132 may determine that the sandboxed browser process operating in the sandboxed computing environment 120 is attempting to access an untrusted network destination. The sandbox container process 132 may allow the sandboxed browser process operating in the sandboxed computing environment 120 to access the untrusted network destination. As another example, the sandbox container process 132 may determine that the sandboxed browser process operating in the sandboxed computing environment 120 is attempting to access a trusted network destination. The sandbox container process may spawn an instance of a browser process in the workspace 114 to provide access to the trusted network destination.

As an example, a sandbox container process 130 may determine that the sandboxed email process operating in the sandboxed computing environment 126 is attempting to access the sandboxed browser process operating in the sandboxes computing environment 120. This may occur when a user receives an email in a sandboxed computing environment 126 and clicks a link to a website included in the email. The sandbox container process 130 may be configured to prevent communication (e.g., direct communication) between the two processes, e.g., between the sandboxed browser process running in sandbox computing environment 120 and the sandboxed email process running in the sandbox computing environment 126. A sandbox firewall associated with either or both sandboxed computing environments, for example 132 and 130 respectively, may be configured to prevent such communication. If one or more sandboxed container processes prevent direct communication between one or more sandboxed applications/processes and applications/processes operating in other memory spaces, the sandboxed computing environment may be protected (e.g., further protected) from malware. In case of a malware intrusion within a sandboxed computing environment, the infected container (e.g., only the infected container) may be restored to a malware-free version (e.g., pristine copy) instead of restoring all sandbox computing environments.

A sandboxed computing environment, such as shown by 120, 126 and/or 128 may receive malware from an untrusted network device. For example, the sandboxed computing environment (e.g., 120, 126, and/or 128) may communicate with the untrusted network device on the Internet (e.g., via a proxy/web-content filter and/or other intermediate device). The untrusted network device may send malware (e.g., malicious software) to the sandboxed computing environment (e.g., 120, 126, and/or 128). The malware may be executed within the sandboxed computing environment (e.g., 120, 126, and/or 128). The executed malware may start one or more processes, download one or more payloads, and/or execute the one or more payloads. The processes and/or payloads may be executed within the sandboxed computing environment (e.g., 120, 126, and/or 128), for example, instead of on the workspace 114 of the operating system 122. When the sandboxed computing environment (e.g., 120, 126, and/or 128) has received malware, the sandboxed computing environment (e.g., 120, 126, and/or 128) may be considered infected.

Even when the sandboxed computing environment (e.g., 120, 126, and/or 128) is infected, the use of the sandbox based Internet isolation may allow the mobile device 110 to be considered to be uninfected and trusted. The mobile device 110 may be considered uninfected and trusted because the memory space of the sandboxed computing environment (e.g., 120, 126, and/or 128) and the processes operating therein may be separated and isolated from the memory space for the workspace 114 (e.g., the first memory space) of the mobile device 110. The introduced malware may not be able to access the resources, assets, and/or files of the operating system 122 or any other memory space of the host computing device 110. For example, the sandbox firewall 116 may prevent the introduced malware from accessing the resources, assets, and/or files of the operating system 122. The trusted network (e.g., to which the mobile device 110 is connected) may be deemed to be uninfected and trusted, for example, because the mobile device 110 is considered trusted and uninfected.

A sandboxed computing environment (e.g., 120, 126, and/or 128) that becomes infected and/or untrusted may encounter problems. The sandbox container process(es) associated with the infected sandboxed computing environment may become inoperable, for example, due to the introduced malware. An infected sandbox environment may restore a pristine copy (e.g., a "clean slate") of the sandboxed computing environment(s) (e.g., 120, 126, and/or 128), its associated sandbox container process(es) (e.g., 132, 130, and/or 116, respectively), and/or its separated and isolated memory space. An infected sandboxed computing environment may be cleared (e.g., cleared immediately) and reverted to its original, trusted condition. For example, one or more (e.g., all) aspects of the introduced malware may be removed from the sandboxed computing environment (e.g., 120, 126, and/or 128) without any harm to the operating system 122. The sandbox computing environment may have a "clean slate" initiated periodically, e.g., once a day, once every 12 hours, once an hour, etc. The sandbox computing environment may have a "clean slate" initiated on demand, e.g., based on an indication and/or input received from the user of the mobile device 110. The "clean slate" may be initiated using a restore capability of the sandbox computer environment.

For example, the workspace 114 of the mobile device 110 may include at least one host monitoring process. The at least on host monitoring process may be configured to monitor the collective sandboxed computing environment 118 and/or each sandbox container environment (e.g., 120, 126, and/or 128). The at least one host monitoring process may be configured to restore a sandbox environment to a known good version. The at least one host monitoring process may be configured to restore a sandbox environment based on one or more of a user input, an application input, detection of an abnormality in a sandbox container process(es), or expiration of predetermined period of time (e.g., a timer-based refresh mechanism).

The mobile device 110 may be configured to store a restore point of the collective sandboxed computing environment 118 and/or each sandbox environment (e.g., 120, 126, and/or 128). The restore point may be associated with a configuration of the collective sandboxed computing environment 118 and/or each sandbox environment (e.g., 120, 126, and/or 128). The mobile device 110 (e.g., an application or process operating within the workspace 114) may detect anomalous behavior within the collective sandboxed computing environment 118 and/or each sandbox environment (e.g., 120, 126, and/or 128). The mobile device 110 may restore the collective sandboxed computing environment 118 and/or each sandbox container environment (e.g., 120, 126, and/or 128) to the restore point, for example, based on detection of the anomalous behavior.

If malware on an infected sandboxed computing environment is able to access the resources, assets, and/or files of the operating system 122, the mobile device 110 may be considered infected and untrusted. For example, the malware may bypass the sandbox firewall 116, for example via explicit user input. In an example, the other mobile device and/or host computer systems connected to the trusted network may also be utilizing similar security and isolation systems as is described with respect to the mobile device 110. Even if one of the computers on the trusted network is infected and transmits malware on the LAN, the host-based firewall 112 configured on the other devices connected to the trusted network may prohibit the introduced malware from communicating with/being passed to these other devices on the trusted network. For example, the host-based firewall 112 may be configured to block incoming traffic from the trusted network, except for traffic from predetermined devices on predetermined network ports. For example, the host-based firewall 112 may allow the mobile device 110 to send outgoing messages on the trusted network (e.g., in order to reach certain trusted network locations), but the host-based firewall 112 may be configured to block incoming communications from the other devices connected to the trusted network, except for traffic from predetermined devices on predetermined network ports. Thus, when an untrusted mobile device is connected to the trusted network, the trusted network may remain uninfected and trusted even when other devices on the trusted network become infected.

Malware may be introduced to the operating system 122 from a source other than communication with the Internet. For example, malware may be introduced to the operating system 122 via an infected email, an infected USB memory stick, and/or another infected hardware device.

An infected and/or untrusted mobile device (e.g., regardless of the introduced malware's vector) may have no communication (e.g., direct communication) with the Internet. For example, sandbox container process(es) may be configured to prevent the processes and applications in the workspace 114 from being allowed to access sandbox computing environment resources, applications, and/or processes, which may prevent malware introduced into the workspace 114 from communicating with its source or other devices (e.g., via the Internet and/or on the Internet). Without a connection to (e.g., communication with) the Internet, the introduced malware may be prevented from performing many toolset functions from within the workspace 114 as described herein or any other function that an enslaved, infected and/or untrusted mobile device may perform. Without a connection to the Internet, the introduced malware may not be able to transfer any data from the infected and/or untrusted mobile device (e.g., the workspace 114) to the Internet.

Malware may attempt to circumvent implemented host-based security protections. For example, the introduced malware may attempt to tamper with processes that are critical to the functioning of the host-based security protections. The one or more processes may monitor the host-based security protections for tampering (e.g., by way of secondary processes or security applications). The one or more monitoring processes may be locally stored in the mobile device (e.g., within the workspace) and/or be a trusted network destination. Monitoring process may determine that one or more host-based security protection related processes have been tampered with, are missing, have stopped, and/or have been otherwise altered. Host-based security protection related processes may include processes associated with the host-based firewall 112 and/or a sandboxed computing environment, as shown by the collective sandbox computing environment 118 running on the operating system 122. Monitoring process may instantiate or re-initialize an unaltered versions of the tampered, missing, stopped, and/or otherwise altered host-based security protection related processes upon detecting an abnormality.

The monitoring process may monitor for any exceptions to normal and trusted operations of the mobile device 110. The monitoring process may send an alert message to a central monitoring security system. The alert message may indicate that one or more security protection related processes were restarted (e.g., automatically restarted). The alert message may include such details as required for the proper detection and remediation of the introduced malware. For example, a network operator of a cellular network may be notified of the detected threat or abnormality.

The monitoring process and/or the sandbox container process may detect an introduced malware's blocked attempt(s) to communicate with the Internet. For example, monitoring process and/or the sandbox container process may detect one or more blocked toolset functions and/or exceptions described herein, or any other blocked functions that an enslaved, infected mobile device may perform. An alert message that indicates the detected blocked communication attempt(s) may be sent to the central monitoring security system (e.g., within a trusted network).

The monitoring process and/or the sandbox container process may detect blocked communication attempts and/or exceptions using one or more of an event log from the mobile device 110, another firewall device within a trusted network (e.g., from the network isolation firewall), an intrusion detection monitoring device within the a trusted network, a user authentication server within a trusted network, and/or the like.

When an infected and/or untrusted mobile device connected to the trusted network is detected, the trusted network may perform remediation. Remediation may include one or more of removal of the infected and/or untrusted mobile device from the trusted network, analysis of the infected and/or untrusted mobile device, removal of the introduced malware from the infected and/or untrusted mobile device, rebuilding of the infected and/or untrusted host computer system to a trusted configuration, and/or replacing the infected and/or untrusted mobile device with another trusted mobile device (e.g., such as the mobile device 110).

The mobile device 110 and/or the trusted network may limit the adverse effects of received malware. For example, the mobile device 110 and/or the trusted network may prevent the received malware from using its programmed vector(s) to communicate data from the mobile device 110.

An author of the malware may not be aware of any level of efficacy of the introduced malware, its successful attack vector, and/or any data of an infected host computer system that may have been compromised or collected, for example, because the internet isolation system and/or network isolation may prevent communication between an infected and/or untrusted mobile device and the Internet (not shown).

An electronic mail (email) may be exchanged between the mobile device 110 and the Internet. For example, a trusted network may include an intermediary email device (e.g., an email server, an email proxy, and/or the like) (not shown). The email may be sent and/or received by the mobile device 110 using an email application running on the operating system 122. The intermediary email device may be located within the trusted network. The intermediary email device may be located outside of the trusted network.

The exchange of email between the mobile device 110 and the Internet may be accomplished through a web browser application, for example, when the intermediary email device is not included in the trusted network. The exchange of email may be accomplished via a sandboxed computing environment 126 (e.g., as described herein using the sandboxed email process operating in the sandbox computing environment 126 and/or a sandboxed web process operating in the sandbox environment 120).

One or more files may be exchanged between the mobile device 110 and untrusted network destinations, for example devices on the Internet. The files may be exchanged using an intermediary secure transfer device (e.g., a transfer server, a transfer appliance, and/or the like) (not shown). The intermediary secure transfer device may be located in a trusted network, for example, connected to a border firewall. The intermediary secure transfer device may be located within the trusted network.

The mobile device 110 may exchange files with an untrusted network destination, for example a device on the Internet. The files may be transferred from the mobile device 110 and/or an untrusted network destination to the intermediary secure transfer device. A file transfer may be initiated from the mobile device 110 and/or from the device on the Internet. The file transfer may utilize an encrypted protocol via a predetermined network port. Authenticity of the file transfer may be validated, for example, prior to any data transfer.

For example, files may be copied using Secure Socket Shell (SSH) or Secure Socket Shell File Transfer Protocol (SFTP), or Hyper Text Transfer Protocol Secure (HTTP). Prior to any data transfer, a Two Factor Authentication (TFA) may be used to validate that the file transfer is authentic and/or not part of a malware toolset. Other encrypted protocol(s), network port(s), and/or authentication combination(s) may be employed for data transfers from the mobile device 110 to the intermediary secure transfer device.

The files received from the mobile device 110 may be transferred from the intermediary secure transfer device to an untrusted network device, for example a device on the Internet. The file transfer may be initiated from the device on the Internet. The file transfer may utilize an encrypted protocol via a predetermined network port. Authenticity of the device on the Internet may be validated, for example, prior to any data transfer.

For example, files may be copied using Secure Socket Shell (SSH) or Secure Socket Shell File Transfer Protocol (SFTP) operating over the network port 22. Prior to any data transfer, a Two Factor Authentication (TFA) may be used to validate the authenticity of the device on the Internet. Other encrypted protocol(s), network port(s), and/or authentication combination(s) may be employed for data transfers from the intermediary secure transfer device to a device on the Internet.

The files received from the untrusted device by the intermediary secure transfer device may be transferred from the intermediary secure transfer device to the mobile device 110. The file transfer may be initiated from the mobile device 110. The file transfer may utilize an encrypted protocol via a predetermined network port. Authenticity of the device on the Internet may be validated, for example, prior to any data transfer.

Figure 3B:
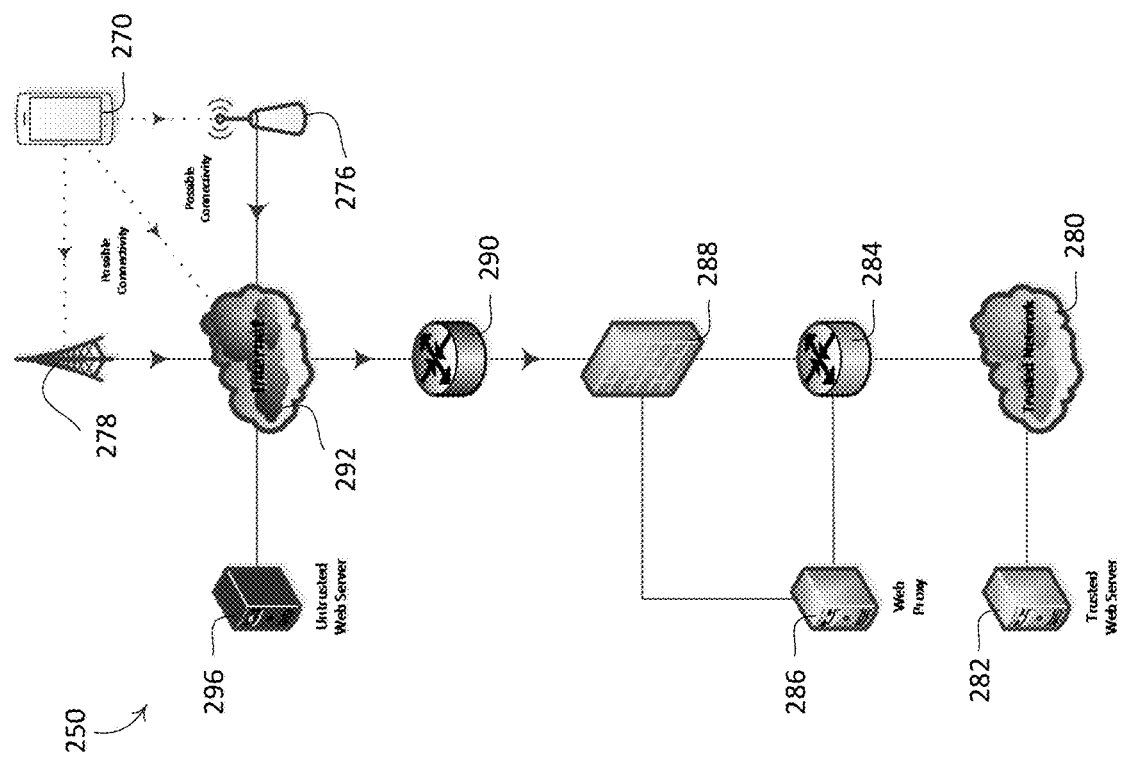
FIG. 3B depicts an example mobile device connected to an untrusted network.
Figure 3A:
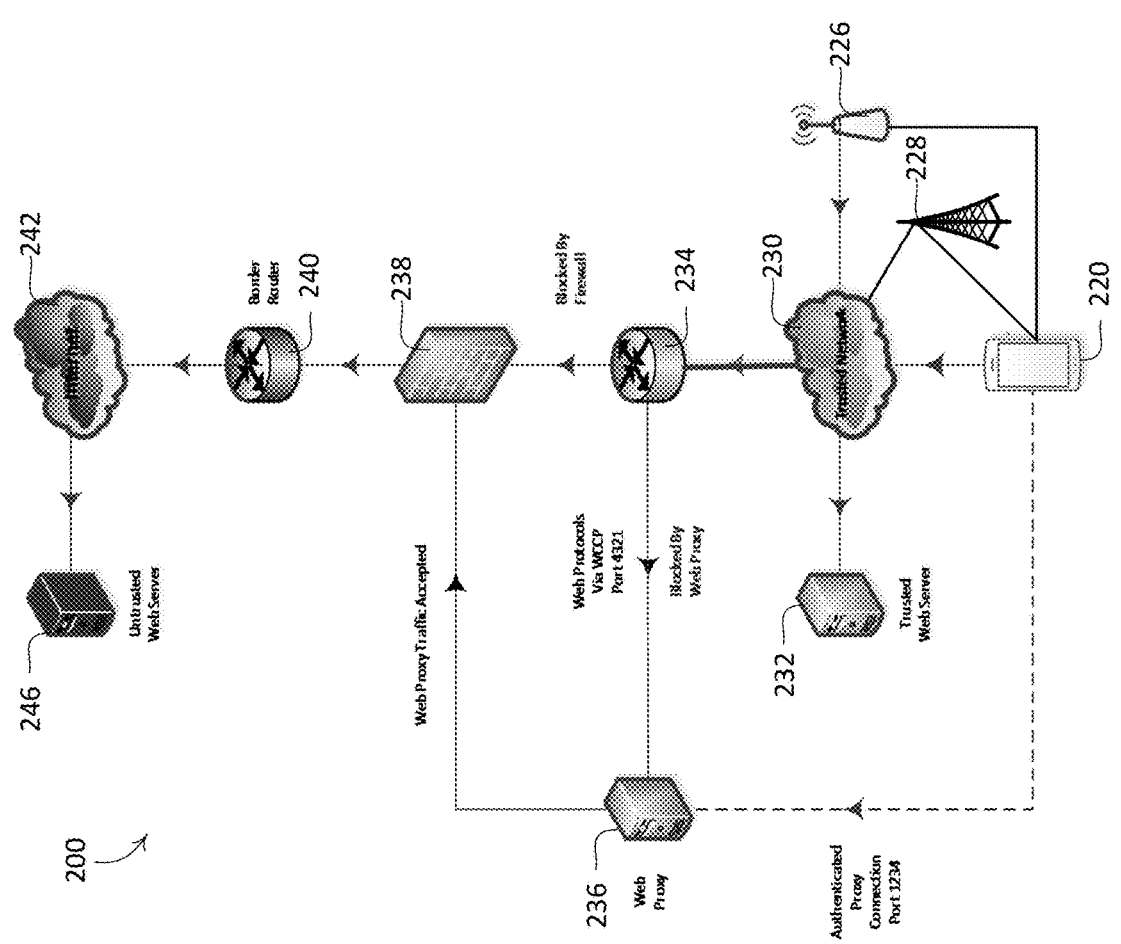
FIG. 3A depicts an example mobile device connected to a trusted network.

FIG. 3A depicts an example whereby the mobile device may allow one or more sandboxed applications to communicate with a untrusted destinations via a trusted network. FIG. 3B illustrates an example whereby the mobile device may allow one or more sandboxed applications to communicate with a untrusted destinations via a tunnel or secure connection to trusted network from an untrusted network.

FIG. 3A illustrates an example computer system 200 that may be used or accessed by a mobile device 220 in order to communicate with the an untrusted destination. Although not shown in FIG. 3A, the mobile device 220 may be configured with a sandbox based internet isolation system that isolates one or more applications within a sandboxed computing environment (e.g., such as mobile device 110 as shown in FIG. 2). The mobile device may establish connectivity with a trusted network 230. For example, the trusted network 230 may be a home network, a work network, an enterprise network, a trusted cellular communication network, and/or any other network trusted by the mobile device 220. The mobile device 220 may have a wireless communication link to the trusted network 230, for example via cellular base station 228 and/or access point (e.g., WiFi) 226, for example. Other communications links may be used to connect to and/or communicate between the mobile device 220 and the trusted network 230.

The network 200 may include the trusted network 230, a trusted web server 232, an subnet router 234, a border firewall 238, a border router 240, and/or a web proxy 236. Access to the trusted web server 232 may be provided via the trusted network 230. The trusted network 230 may connect the subnet router 234 to one or more other routers or switches serving the mobile device 220. The border firewall 238 may be configured to restrict traffic to the untrusted network resources (e.g., the Internet 242) to be from the web proxy 236 and/or the subnet router 234. The mobile device 220 may access an untrusted web server 246, for example, via the border firewall 238 and/or the border router 240. The border firewall 238 may be configured to block communication between one or more devices on the networked computer system 200 and one or more untrusted network destinations, (e.g., the Internet 242). For example, the border firewall 238 may be configured to block untrusted traffic that is not routed through the web proxy 236. The web proxy 236 may be configured to analyze and/or validate communication between one or more of the mobile device 220 and untrusted network destinations (e.g., a device on the Internet 242). Some communication, for example, between predetermined devices and/or via a predetermined set of protocols, may not be analyzed or validated by the web proxy 236. The web proxy 236 may determine that communication between a mobile device on the networked computer system 200 and the device on the Internet 242 is allowed. If the web proxy 236 determines that communication between the mobile device and the device on the Internet 242 is allowed, the web proxy 236 may act as an intermediary communication point between the mobile device on the networked computer system 200 and the device on the Internet 242. If the web proxy 236 determines that communication between the mobile device and the device on the Internet 242 is not permitted, the web proxy 236 may terminate the communication (e.g., communication session).

The networked computer system 200 may be configured to utilize a Web Cache Control Protocol. The network computer system 200 may redirect web related traffic that is intended for an untrusted resource (e.g., such as the Internet 242) to the web proxy 236, for example, using the Web Cache Control Protocol. For example, the subnet router 234 may receive traffic web related traffic from the trusted network 230. The subnet router 234 may redirect the web related traffic to the web proxy 236, for example. The Web Cache Control Protocol may route the web-related traffic to the web proxy 236 via a predetermined network port, for example, network port 4321 as shown. The web proxy 236 may determine (e.g., uniquely distinguish) that the traffic received from the networked computer system 200 is via the Web Cache Control Protocol, for example, based on the network port. The web proxy 236 may be configured to block one or more requests sent from one or more applications and/or processes operating within the workspace (e.g., the non-sandboxed portion of) the mobile device 220, for example, based on the one or more requests being associated with the network port on which it is received. The web proxy 236 may be configured to allow a browser or other process or application that is included within a sandboxed computing environment of the mobile device 220 to access the untrusted destination based on the sandbox container process successfully authenticating with the web proxy 236 on behalf of the browser process. The sandbox container process may be configured to authenticate with the web proxy 236 using one or more types of authentication methods. Web proxy 236 may block traffic from device and/or addresses on trusted network 230 that have not authenticated with web proxy 236.

Although not shown in FIG. 3A, the mobile device 220 may include a host-based firewall, an operating system, a sandboxed computing environment, a sandbox firewall, and a workspace. The sandboxed computing environment may include resources (e.g., a limited set of resources) allocated to operation of a sandbox container process. The sandboxed computing environment may be enforced via the sandbox container process and/or the sandbox firewall. The sandbox container process may be a security mechanism used to separate resources associated with the sandboxed computing environment from other applications and/or processes that may be running on a workspace of the mobile device 220. The sandboxed container process may be configured to enable one or more applications and/or processes (e.g., such as browser process, an email process, etc.) being executed within the sandboxed computing environment to access the resources allocated for operation of the sandbox container process. For example, the one or more applications and/or processes being operated within the sandboxed computing environment may be allowed to access memory associated with the sandboxed computing environment. The memory associated with the sandboxed computing environment may be separate from memory that is configured to enable storage and operation of the workspace.

The workspace of the mobile device 220 may include one or more processes operating within the operating system that are not restricted by the sandbox container process. The operating system of the mobile device 220 may include a set of resources configured to enable operation of the workspace and the sandbox container process.

The mobile device 220 may enable the host-based firewall. The host-based firewall may prohibit and/or prevent communication (e.g., direct communication) between the mobile device and other devices. For example, the host-based firewall may be configured to block incoming traffic to the workspace of the mobile device 220 that is sent from the other devices within the networked computer system 200. The host-based firewall may allow traffic received by the mobile device 220 via one or more predetermined devices and/or ports. For example, the host-based firewall may allow traffic sent to an application within a sandboxed computing environment while blocking traffic sent to an application within the workspace. The host-based firewall may allow certain predetermined traffic to be sent to an application in the workspace, for example allowing predetermined devices and/or predetermined addresses to bypass the host-based firewall, for example, using a predetermined set of protocols and/or ports.

The host-based firewall may be implemented using software and/or hardware. For example, the host-based firewall may be implemented using software that is commercially available, for example, such as Symantec Endpoint Protection, MacAfee Host Based Security Systems, etc. The host-based firewall may be implemented using software inherent in the operating system of the mobile device 220. The host-based firewall may be implemented using software for configuring and/or implementing restrictive ingress and/or egress policies on the mobile device 220.

The mobile device 220 may run one or more sandboxed computing environments. The sandboxed computing environment(s) may run within the operating system of the mobile device 220. For example, the sandboxed computing environment(s) may be configured to run within one or more separate memory space(s) of the mobile device 220. A first memory space may be configured to enable storage and operation of a workspace configured to execute a first set of one or more applications and/or processes running on the operating system of the mobile device 220. The one or more sandbox computing environments (e.g. each) may be configured to enable storage and operation of a set of one or more applications and/or processes running within their respective (e.g., each) separated memory space of the mobile device 220. The sandboxed computing environment(s) may be prohibited from communicating with other devices within the networked computer system 200, for example prohibited from communicating with trusted destinations within network 200.

Browsers or other applications running within the workspace of the mobile device 220 may be utilized for communication between the mobile device 220 and trusted network destinations. For example, browser processes running within the workspace of the mobile device 220 may enable access to the trusted network destinations.

Each of the one or more sandboxed computing environment may provide separate and/or isolated memory space from the workspace of the mobile device 220 or any other memory space. For example, the sandboxed computing environment(s) (e.g., each) may be enforced using one or more of a sandbox container process. The sandbox container process (e.g. each) may segregate the workspace and any other memory space from their respective sandboxed computing environment. The first memory space (e.g., the workspace memory) may enable storage and/or operation of the workspace. The operating system may enable operation of the sandboxed computing environment(s). A second memory space may enable storage and/or operation of one or more applications and/or processes associated with a first sandboxed computing environment. For example, the second memory space may be reserved for storage and/or operation of the applications and/or processes running within the sandboxed computing environment. The sandbox container process may isolate the first memory space and/or any other memory spaces from the second memory space. For example, the first sandbox container process may enable the first sandbox firewall. The first sandbox firewall may enforce a separation of the first and/or any other memory spaces from the second memory spaces. For example, the first sandbox firewall may allow a predefined set of processes to be executed within the first sandboxed computing environment. The first sandbox firewall may prevent execution, in the first sandboxed computing environment, of any processes outside of the predefined set of processes. The second memory space may be referred to as a separate and/or isolated memory space. The first sandbox container process may segregate the second memory space, any additional processes and/or memory usage required for usage of untrusted network destination related content during an established communication session. Separation and/or isolation of computer resources may be referred to as a virtual air gapped solution. The first memory space and the second memory space may be separate physical memory locations. The first memory space and the second memory space may be collocated on a physical memory.

The separate and/or isolated second memory space and the processes therein, may have limited access to the resources, assets, and/or files of the remainder of the computer-accessible data storage or memory space of the mobile device 220. Data transfers between the first sandboxed computing environment and the workspace of the mobile device 220 may be restricted to set transfer types. The set transfer types may be configured to minimize the possibility of malicious data migrating from the first sandboxed computing environment to the workspace of the mobile device 220. The first sandboxed computing environment may transfer (e.g., only transfer) data to or from the workspace of the mobile device 220 in response to a user input directing the data transfer. The user input may be an explicit user input such as checking a box and/or selecting a button on an information prompt. The set transfer types that require user input may include manual operations. For example, the set transfer types may include cut or copy of data, paste of data, a printing of data to a local printer, or a file transfer.

The operating system may access (e.g., only access) the separate and isolated memory space associated with the first sandboxed computing environment as required for the proper operation of the sandboxed computing environment. The first sandbox firewall may be built-in with the first sandboxed computing environment. Additional sandbox computing environments similar to the first sandbox computing environment (e.g. similar in creation, function, segregation, and/or purpose) may be created on the mobile device 220 thereby creating a multi-sandbox container environment.

The first sandboxed computing environment, when activated, may enable communication (e.g., indirect communication) between the mobile device 220 and an untrusted network destination (e.g., the Internet 242) via the web proxy 236. The sandboxed computing environment may be activated via an app installed on the mobile device and/or may be transparently configured on the mobile device 220, for example as part of the operating system of the mobile device 220.

As an example, an application located on the home screen of the mobile device may be activated, for example, by a user selection, which may instantiate the sandbox based internet isolation system on mobile device 220. Instantiating the sandbox based internet isolation system may include instantiating the one or more sandboxed computing environment(s)/memory space(s), and executing one or more applications (e.g., such as a browser and/or email application) in the sandbox memory space (e.g., each of). In an example, a sandbox container process may automatically detect when a browser process is selected for activation. When the browser process is activated, the sandbox container process may determine whether the request should be executed in the workspace or in the sandbox memory space, for example based on the address or device to which the communication session is being established. For example, the sandbox container process may activate the browser process within the sandboxed computing environment if the communication is to be established with an untrusted destination.

A sandboxed program (e.g., a browser process), when activated by a sandbox container process, may initiate a communication session to the web proxy 236. For example, the communication session may be initiated utilizing an encrypted protocol on a predetermined network port that is different from the network port utilized by the Web Cache Control Protocol. During the initiation of the communication session, the sandboxed computing environment may validate the authenticity of a sandbox browser process request for the communication session. The sandboxed computing environment may authenticate the sandbox browser process request using an authentication mechanism with the web proxy 236. If the sandbox computing environment process request fails authentication, the communication session may be terminated, for example, by the web proxy 236.

The sandbox container process may initiate a communication session with the web proxy 236 using an authentication mechanism. As an example, the sandbox container process may initiate the browser process and the communication session with the web proxy 236 using a Secure Socket Layer (SSL) and the predetermined network port 1234. As another example, the sandbox container process may initiate the communication session using NTLM protocols and the predetermined network port 1234. As part of the communication session, the sandboxed computing environment may send validation credentials to the web proxy 236, for example, using a predetermined authentication mechanism. The predetermined authentication mechanism may be a username/password combination. The username/password combination may be encrypted, for example, with an asymmetric or a symmetric encryption key system. The web proxy 236 may be the only device able to decrypt the username/password combination.

The sandbox container process may be configured to authenticate with the web proxy 236. For example, the sandbox container process may authenticate with the web proxy 236 on behalf of the browser process. The sandbox container process may authenticate with the web proxy 236 using credentials stored in a configuration file. The configuration file may be encrypted. For example, the sandbox container process may be configured to read only encrypted configuration files.

Upon successful creation of a communication session between the sandboxed computing environment and the web proxy 236, the web proxy 236 may analyze and/or validate the request to communicate with an untrusted network destination. If the request to communicate with the untrusted network destination is permitted, the web proxy 236 may act as an intermediary communication point between the sandboxed computing environment and the untrusted network destination.

A user may initiate a browser process and may enter and/or select a network destination. The mobile device 220 may initiate the browser process in the workspace or a sandboxed computing environment. The mobile device 220 may determine whether the network destination is trusted or untrusted. The mobile device 220 may provide access to a trusted network destination via the browser process executed in the workspace. The mobile device 220 may provide access to an untrusted network destination via the browser process executed in the sandboxed computing environment. For example, the sandbox container process may be configured to spawn an instance of the browser process in the sandboxed computing environment to provide access to the untrusted network destination.

As an example, a sandbox container process may determine that a browser process operating in the workspace is attempting to access an untrusted network destination. The sandbox container process may spawn an instance of the browser process in the sandboxed computing environment to provide access to the untrusted network destination. The sandbox container process may determine that the browser process operating in the workspace is attempting to access a trusted network destination. The sandbox container process may allow the browser process operating in the workspace to access the trusted network destination.

As another example, the sandbox container process may determine that the browser process operating in the sandboxed computing environment is attempting to access an untrusted network destination. The sandbox container process may allow the browser process operating in the sandboxed computing environment to access the untrusted network destination. As another example, the sandbox container process may determine that the browser process operating in the sandboxed computing environment is attempting to access a trusted network destination. The sandbox container process may spawn an instance of a browser process in the workspace to provide access to the trusted network destination.

The one or more sandboxed computing environments may receive malware from an untrusted network device. For example, a sandboxed computing environment may communicate with the untrusted network device on the Internet 242 via the web proxy 236. The untrusted network device may send malware (e.g., malicious software) to the mobile device 220. The malware may be executed within the sandboxed computing environment running on the mobile device 220. The executed malware may start one or more processes, download one or more payloads, and/or execute the one or more payloads. The processes and/or payloads may be executed within the sandboxed computing environment, for example, instead of on the workspace of the operating system. When the sandboxed computing environment has received malware, the sandboxed computing environment may be considered infected and/or may be considered untrusted.

When a sandboxed computing environment is infected and/or untrusted, the mobile device 220 may be considered to be uninfected and trusted. The mobile device 220 may be considered uninfected and trusted because the memory space of the sandboxed computing environment and the processes operating therein may be separated and isolated from the memory space for the workspace and/or any other memory space (e.g., the rest of the operating system) of the mobile device 220. The introduced malware may not be able to access the resources, assets, and/or files of the operating system. For example, a sandbox firewall may prevent the introduced malware from accessing the resources, assets, and/or files of the operating system.

A sandboxed computing environment that is infected and/or untrusted may encounter problems. The sandbox container process associated with the infected sandboxed computing environment may become inoperable, for example, due to the introduced malware. An infected sandbox container process may restore a pristine copy (e.g., a "clean slate") of the sandbox browser processes and/or its separated and isolated memory space. An infected sandboxed computing environment may be cleared (e.g., immediately) and reverted to its original, trusted condition. For example, one or more (e.g., all) aspects of the introduced malware may be removed from the sandboxed computing environment without any harm to the operating system. The sandbox container process may initiate a "clean slate" periodically, e.g., once a day, once every 12 hours, once an hour, etc. The sandbox container process may initiate a "clean slate" on demand, e.g., based on an input and/or indication received from the user of the mobile device 220. The "clean slate" may be initiated using a restore capability of the sandbox container process.

For example, the workspace of the mobile device 220 may include at least one host monitoring process. The at least on host monitoring process may be configured to monitor the one or more sandboxed computing environment and/or the one or more respective sandbox container process. The at least one host monitoring process may be configured to restore a sandbox container process to a known good version. The at least one host monitoring process may be configured to restore the sandbox container process based on one or more of a user input, an application input, detection of an abnormality in the sandbox container process, or expiration of predetermined period of time.

The mobile device 220 may be configured to store a restore point of a sandboxed computing environment. The restore point may be associated with a configuration of the sandboxed computing environment. The mobile device 220 (e.g., an application or process operating within the workspace) may detect anomalous behavior within the sandboxed computing environment. The mobile device 220 may restore the sandboxed computing environment to the restore point, for example, based on detection of the anomalous behavior.

If malware on an infected sandboxed computing environment is able to access the resources, assets, and/or files of the operating system, the mobile device 220 may be considered infected and untrusted. For example, the malware may bypass the sandbox firewall via explicit user input. The host-based firewall may prohibit the introduced malware from communicating with any other device on the trusted network 230. For example, the host-based firewall may be configured to block incoming traffic to the workspace (e.g., unless from a predetermined trusted destination using a predetermined protocol).

Malware may be introduced to the operating system from a source other than communication with the Internet 242. For example, malware may be introduced to the operating system via an infected email, via a USB connection to another device, and/or from other communication with another infected hardware device.

If the workspace portion of the mobile device 220 becomes infected, the infected and/or untrusted mobile device (e.g., regardless of the introduced malware's vector) may have no communication (e.g., direct communication) with the Internet 242. For example, the border firewall 238 may prevent the infected and/or untrusted mobile device from communicating with the Internet 242. Without a connection to (e.g., communication with) the Internet 242, the introduced malware may be prevented from performing many toolset functions or any other function that an enslaved, infected and/or untrusted mobile device may perform. Without a connection to the Internet 242, the introduced malware may not be able to transfer any data from the infected and/or untrusted mobile device to the Internet 242. Although an infected sandbox container process may be able to communicate with the Internet 242 (e.g., via the web proxy 236 after authentication), the malware in such a scenario would be able to access the memory space of the sandbox container process but not of the workspace. Thus, sensitive data in the workspace may be protected even if the sandboxed computing environment is compromised.

Malware may attempt to circumvent implemented host-based security protections. For example, the introduced malware may attempt to tamper with processes that are critical to the functioning of the host-based security protections. The networked computer system 200 may monitor the host-based security protections for tampering (e.g., by way of secondary processes or security applications). The networked computer system 200 may determine that one or more host-based security protection related processes have been tampered with, are missing, have stopped, and/or have been otherwise altered. For example, trusted network 230 may be a cellular network, and the network operator may have one or more network processes designed to ensure that the sandbox container process and/or sandboxed computing environment are operating according to a desired configuration. Host-based security protection related processes may include processes associated with the host-based firewall and/or the one or more sandboxed computing environments running on the operating system. The networked computer system 200 may initiate unaltered versions of the tampered, missing, stopped, and/or otherwise altered host-based security protection related processes.

The trusted network 230 may monitor for any exceptions to normal and trusted operations of the mobile device 220. The networked computer system 200 may send an alert message to one or more devices on the trusted network 230. The alert message may indicate that one or more security protection related processes were restarted (e.g., automatically restarted). The alert message may include such details as required for the proper detection and remediation of the introduced malware.

The trusted network 230 may detect an introduced malware's blocked attempt(s) to communicate with the Internet 242. For example, the networked computer system 200 may detect one or more blocked toolset functions and/or exceptions described herein, or any other blocked functions that an enslaved, infected mobile device may perform. An alert message that indicates the detected blocked communication attempt(s) may be sent to one or more devices on trusted network 230. For example, the device on trusted network 230 that detects the blocked communication attempt(s) may send the alert message.

The trusted network 230 may detect blocked communication attempts and/or exceptions using one or more of an event log from the mobile device 220, the border firewall 238, the web proxy 236, another firewall device within the networked computer system 200, an intrusion detection monitoring device (not shown) within the networked computer system 200, a user authentication server (not shown) within the networked computer system 200, or the like.

When an infected and/or untrusted mobile device connected to the trusted network 230 is detected, the trusted network 230 may perform remediation. Remediation may include one or more of removal of the infected and/or untrusted mobile device from the trusted network 230, analysis of the infected and/or untrusted mobile device, removal of the introduced malware from the infected and/or untrusted mobile device, rebuilding of the infected and/or untrusted mobile device to a trusted configuration, and/or replacing the infected and/or untrusted mobile device with another host computer system and/or mobile device (e.g., such as the mobile device 220).

The mobile device 220 and/or the trusted network 230 may limit the adverse effects associated with a received malware. For example, the mobile device 220 and/or the trusted network 230 may prevent the received malware from using its vector to communicate data from the mobile device 220.

An author of the malware may not be aware of any level of efficacy of the introduced malware, its successful attack vector, and/or any data of an infected and/or untrusted mobile device that may have been compromised or collected, for example, because the networked computer system 200 may prevent communication between an infected and/or untrusted mobile device and the Internet 242.

An electronic mail (email) may be exchanged between the mobile device 220 and the Internet 242. The exchange of email between the mobile device 220 and the Internet 242 may be accomplished through a web browser application. The exchange of email may be accomplished via a sandboxed computing environment. Any introduced malware attempting to transfer any data via the sandboxed email application and/or sandboxed web browser would be blocked by the internal isolation firewalls that segregate the first memory space (e.g., workspace) from the one or more memory spaces associated with the one or more sandbox computing environments. For example, the internal isolation firewalls prohibit malware and/or any other unauthorized software from utilizing the one or more sandbox computing environments as a connection to the Internet 242.

FIG. 3B illustrates an example where a mobile device 270 may establish a secure connection to a trusted network 280 from an unsecure network, such as via Internet 292. In this manner, the network based isolation and protections utilized when the mobile device is connected directly to a trusted network may also be used when the device is not directly connected to a trusted network.

For example, the mobile device 270 may have a communication channel available to the Internet 292, for example including a wireless link via cellular base station 278 and/or via an access point 276 (e.g., a WiFi hotspot). Although not shown in FIG. 3B, the mobile device 270 may include a sandbox based internet isolation system that includes one or more applications included in one or more sandboxed computing environment as described with respect to FIG. 2 and FIG. 3A. In order to enable network 250 to provide similar network isolation mechanisms and/or routing security as was described with respect to network 200, mobile device 270 may utilize its connection to the Internet 292 to establish a tunnel or other secure communication session with trusted network 280. For example, the mobile device 270 may establish a virtual private network (VPN) connection with the trusted network 280. Upon establishing the tunnel connection with the trusted network 280, any traffic from the mobile device 270 may be sent to the trusted network 280 via the tunnel, and then the traffic may be treated or processing in a manner similar to what is described with respect to FIG. 3A.

For example, one or more applications operating within the workspace of the mobile device 270 (e.g., outside of a sandboxed computing environment) may be allowed to communicate with one or more trusted destinations through the tunnel, for example trusted web server 282. The host-based firewall on mobile device 270 may block traffic from the workspace sent to untrusted destinations, for example if the host-based firewall is configured to block egress communications from the workspace (e.g., unless to a trusted destination). One or more applications operating within one or more sandboxed computing environments within the mobile device 270 may be allowed to communicate with untrusted destinations via the tunnel. For example, the one or more applications operating within a sandboxed computing environment within the mobile device 270 may authenticate with web proxy 286 via the tunnel. After authenticating with the web proxy 286, when a request from one or more applications operating within a sandboxed computing environment within the mobile device 270 send a request to an untrusted destination, the request may be sent through the tunnel to trusted network 280, where subnet router 284 may route the request to the web proxy 286. Since authentication has occurred, the web proxy 286 may permit the communication to be sent to the untrusted destination and forward the request to border router 290 (e.g., after processing by border firewall 288) for delivery via the Internet 292. In this manner, once the mobile device 270 has established the secure tunnel to trusted network 280, communication sent to and from mobile device 270 via the tunnel may be processed by network 250 as if mobile device 280 were directly connected to trusted network 280. Thus, trusted network 280, subnet router 284, web proxy 286, border firewall 288, and/or border router 290 may each process requests sent from the workspace and/or sandboxed computing environment in a manner similar to what is described with respect to FIG. 3A. For example, border firewall 288 may block web-based traffic that is not received from web proxy 286 and web proxy 286 may block web traffic from unauthenticated sources.

Figure 4:
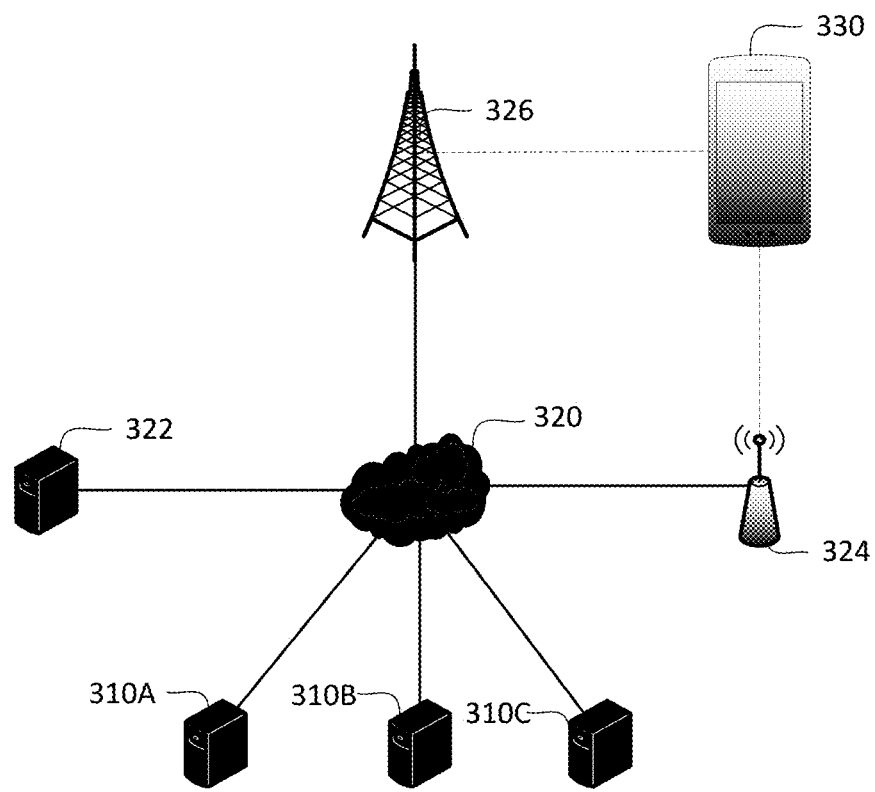
FIG. 4 depicts an example mobile device configured to communicate with one or more destinations on the Internet.

FIG. 4 depicts an example network over which a mobile device may access different services. For example, a mobile device 330 may utilize one or more applications that are associated with trusted and/or untrusted web servers or proxies. For example, untrusted web server 322 may be a third party server utilized by one or more applications being executed on mobile device 330. Mobile device 330 may have access to Internet 320 via one or more intermediary devices, such as cellular base station 326 and/or access point 324. Since untrusted web server 322 may be an untrusted network destination, the applications on mobile device 330 that access untrusted web server 322 may be isolated in one or more sandboxed computing environments. For example, a host-based firewall on mobile device 330 may be configured to block traffic between mobile device 330 and untrusted web server 322 unless the traffic is directed to an appropriate sandbox computing environment. For example, the traffic may be blocked by the host-based firewall if the communication is between the workspace (e.g., non-sandboxed portion) of the mobile device 330 and the untrusted web server 322. In an example, in order for the one or more sandbox applications of mobile device 330 to communicate with untrusted web server 322, a tunnel or VPN connection to a trusted network may be established and the traffic may be routed through the tunnel as described with respect to FIG. 3B.

In an example, mobile device 330 may include one or more applications configured to communicate with one or more other types of servers or proxies. For example, web proxy 310A may be a web proxy used by an Internet Service Provider (ISP), a cloud services provider, a home network, a business network, an enterprise network, and/or the like to provide web-based browsing for mobile device 330. Email server 310B may be an email server used by an ISP, a cloud services provider, a home network, a business network, an enterprise network, and/or the like to provide email caching and delivery for mobile device 330. Application server 310C may be an application server used by an ISP, a cloud services provider, a home network, a business network, an enterprise network, and/or the like to provide any type of service or application to mobile device 330. In order to communicate with web proxy 310A, email server 310B, and/or application server 310C via the Internet 320, mobile device 330 may isolate the application communicating with the servers(s) within one or more sandboxed computing environments (e.g. segregated memory spaces). For example, a sandboxed browser of mobile device 330 may be configured to communicate with web proxy 310A. A sandboxed email application of mobile device 330 may be configured to communicate with email server 310B. A sandboxed application of mobile device 330 may be configured to communicate with application server 310C. By encapsulating an application used to communicate with the servers in a sandbox computing environment (segregated memory space), the mobile device 330 may isolate possible attacks from Internet 320 to the sandbox memory space. The workspace of mobile device 320 may not communicate over the Internet unless the destination is trusted and the communication utilizes a predetermined protocol. In an example, in order for the one or more sandbox applications of mobile device 330 to communicate with web proxy 310A, email server 310B, and/or application sever 310C, a tunnel or VPN connection to a trusted network may be established and the traffic may be routed through the tunnel as described with respect to FIG. 3B. In another example, the one or more sandboxed applications may communicate with web proxy 310A, email server 310B, and/or application sever 310C after the respective sandbox environment first authenticates with the contacted external device. Authentication and/or permitted communication with and/or through the external device may occur as described with respect to mobile device 110 FIG. 2 and/or mobile device 220 FIG. 3a.

Figure 5:
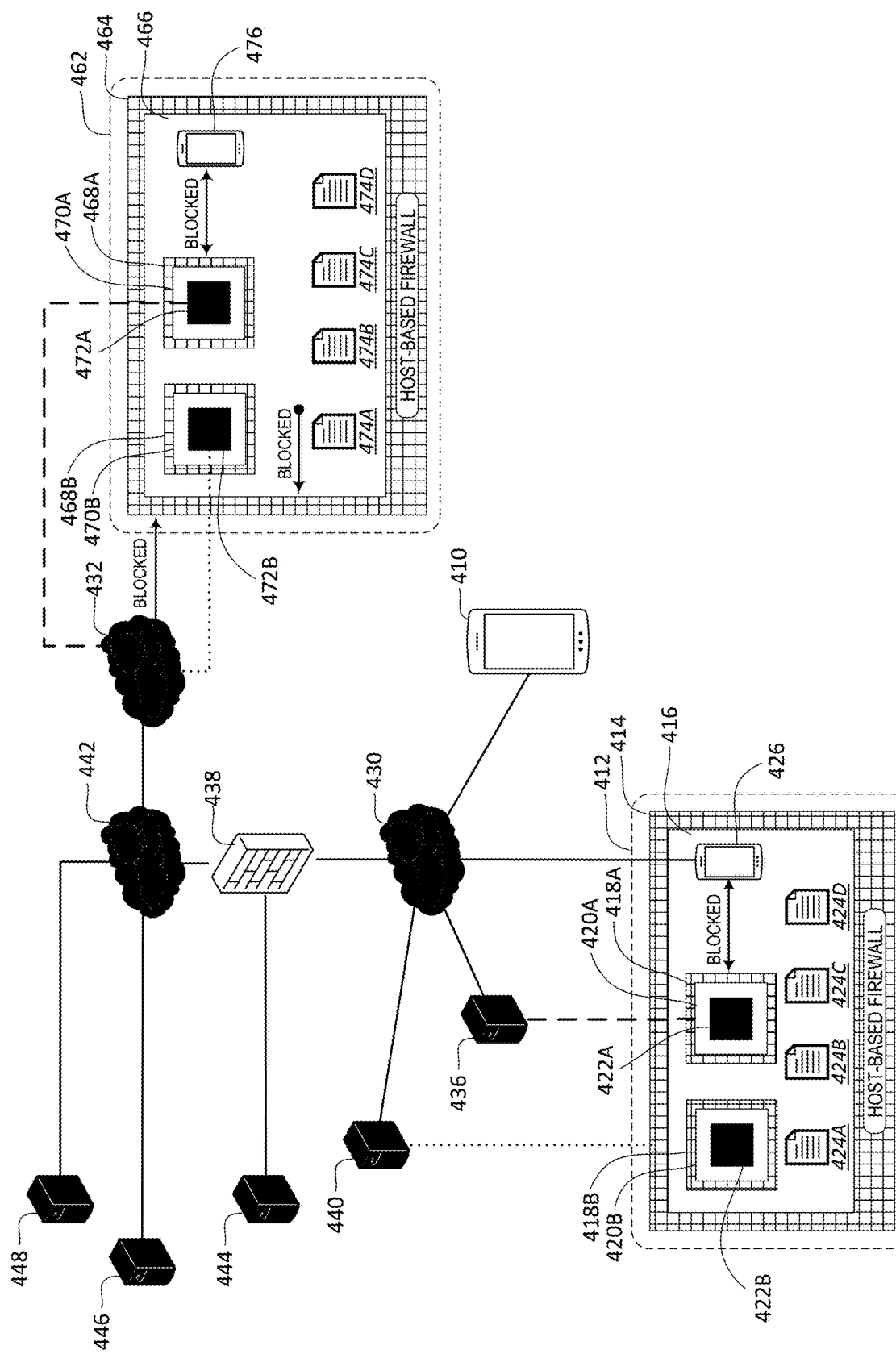
FIG. 5 depicts an example of a mobile device identifying a network connection and implementing an internet isolation configuration that corresponds to the identified network connection.

FIG. 5 depicts an example mobile device 412 connected to a trusted network 430 and another example mobile device 462 connected to an untrusted network 432. The trusted network 430 may include a plurality of physical and/or virtual devices. The trusted network 430 may include a plurality of mobile devices. The untrusted network 432 may be another local network, a public Wi-Fi network, a cellular network, a satellite network, and/or the like.

The mobile device 412 may transmit electrical data signals to one or more other mobile devices (e.g., such as mobile device 410). Each of the mobile devices on the trusted network 430 may be identified by a unique local area network address. The trusted network 430 may include a router (not shown), a border firewall 438, a network-based web proxy 436, and/or a termination device 440. The mobile device 412 may send web traffic (e.g., to one or more trusted URLs) and/or non-web traffic to the trusted network 430 via the operating system 426. The mobile device 412 may send web traffic to one or more untrusted network destinations (e.g., untrusted URLs) using one or more of the border firewall 438, the network-based web proxy 436, a termination device 440, a WAN-based web proxy 444, a first internet-based web proxy 446, and/or an intermediate proxy device 448 (e.g., such as a second internet-based web proxy). For example, the mobile device 412 may access the internet 442 and/or a device on the internet 442 via the trusted network 430, the border firewall 438, the network-based web proxy 436, the termination device 440, the WAN-based web proxy 444, the first internet-based web proxy 446, and/or the intermediate proxy device 448.

The mobile device 412 may include a sandbox-based internet isolation system. For example, the mobile device 412 may include one or more sandboxed computing environments (e.g., such as sandboxed computing environments 420A, 420B). The sandboxed computing environments 420A, 420B may be untrusted portions operating on the mobile device 412. The mobile device 412 may include an anti-virus capability 424A, a process monitoring capability 424B, a document isolation capability 424C, and/or a malware Entrapt capability 424D. For example, the sandbox-based internet isolation system may include the anti-virus capability 424A, the process monitoring capability 424B, the document isolation capability 424C, and the malware Entrapt capability 424D. The sandbox-based internet isolation system may be installed on a mobile device at or during the time of manufacture and/or sale. The installed sandbox-based internet isolation system may implement BIOS and/or hardware based security protections. The sandbox-based internet isolation system may be available to the consumer, for example in a single application and/or application suite.

The anti-virus capability 424A may be configured to prevent, detect, and/or remove malware from the mobile device 412. The anti-virus capability 424A may be based on one or more of signatures, machine learning, or behavioral learning (e.g., user and/or machine). For example, the anti-virus capability 424A may be configured to determine if a process and/or application operating on the mobile device 412 is harmful, malicious, and/or unauthorized based on predefined criteria (e.g., information about process and/or application activity. As another example, the anti-virus capability 424A may analyze operation of the mobile device 412 and may modify (e.g., automatically) criteria used to determine if a process and/or application is harmful, malicious, and/or unauthorized. As another example, the anti-virus capability 424A may analyze interaction between the mobile device 412 and one or more users and may modify (e.g., automatically) criteria used to determine if a process and/or application is harmful, malicious, and/or unauthorized. The anti-virus capability 424A may modify the criteria based on the analysis of the operation of the mobile device 412 and/or based on the analysis of the interaction between the mobile device 412 and the one or more users. The criteria may be located locally to the mobile device 412, for example, within the workspace. The criteria may be located remotely to the mobile device 412. The criteria may be modified and/or updated periodically and/or by user request. The criteria may be modified based on data from the mobile device 412, user interaction, a separate computing device (e.g., such as a server), and/or a subscription methodology.

The process monitoring capability 424B may be configured to ensure that processes operating on the mobile device 412 are running and/or performing as intended. For example, the process monitoring capability 424B may be configured to monitor the sandboxed computing environments 420A, 420B and/or the respective sandbox container processes. The process monitoring capability 424B may be configured to restore the sandbox container processes to known good versions. The process monitoring capability 424B may be configured to restore the sandbox container processes based on one or more of a user input, an application input, detection of an abnormality in the sandbox container process, or expiration of predetermined period of time (e.g., a timer-based refresh mechanism).

The document isolation capability 424C may be configured to isolate sensitive, confidential, and/or proprietary data on the mobile device 412. The document isolation capability 424C may include access to specific file types (e.g., regardless of file content—trusted or untrusted). Access to the sensitive, confidential, proprietary data, and/or configured file types may be isolated to a trusted environment of the mobile device 412. The trusted environment may be the operating system and/or the workspace of the mobile device 412. The document isolation capability 424C may be provided via untrusted memory space segregation.

The Entrapt capability 424D may be configured to use a sandbox internet isolation system to limit and/or segregate security threats. For example, the Entrapt capability 424D may include one or more isolated and segregate memory spaces (e.g., such as sandboxed computing environments 420A, 420B), one or more software based firewalls (e.g., such as internal isolation firewalls 418A, 418B), host-based firewall 414, and/or browser switching.

The trusted network 430 may be connected to the Internet 242 via a border firewall 438. The border firewall 438 may be configured to block communication between one or more devices on the trusted network 430 and one or more untrusted network destinations. The border firewall 438 may have one or more exceptions. For example, one or more predetermined devices and/or applications may bypass the border firewall 438, for example, using a predetermined set of protocols. The one or more predetermined devices on the trusted network 430 may include one or more electronic mail servers (not shown), one or more domain name service servers (not shown), a proxy/web-content filter (not shown), a secure file transfer server (not shown), a central monitoring security system (not shown), and/or any other service providing devices. Communication between the one or more devices and the Internet 242 may utilize one or more protocols required for the proper functioning of said devices.

The mobile device 412 may include a host-based firewall, an operating system, a first sandboxed computing environment 420A, a second sandboxed computing environment 420B, a first internal isolation firewall 418A, a second internal isolation firewall 418B, and a workspace.

Each of the sandboxed computing environments 420A, 420B may include resources (e.g., a limited set of resources) allocated to operation of respective sandbox container processes. For example, the first sandboxed computing environment 420A may be enforced via a first sandbox container process and the second sandboxed computing environment 420B may be enforced via a second sandbox container process. The first and second sandbox container processes may be security mechanisms used to separate resources associated with the respective sandboxed computing environments 420A, 420B from other applications and/or processes that may be running on the workspace or other memory spaces of the mobile device 412. The first and second sandbox container processes may include security mechanisms used to separate resources associated with the sandboxed computing environments 420A and applications and/or processes that may be running within sandbox computing environment 420B and/or any other memory spaces (e.g., and vice versa). The sandboxed container processes may be configured to enable one or more applications and/or processes (e.g., such as a browser process, collaboration software, etc.) being executed within the respective sandboxed computing environments 420A, 420B to access the resources allocated for operation of the sandbox container processes. For example, the one or more applications and/or processes being operated within the first sandboxed computing environment 420A may be allowed to access memory associated with the first sandboxed computing environment 420A and one or more applications and/or processes being operated within the second sandboxed computing environment 420B may be allowed to access memory associated with the second sandboxed computing environment 420B. The memory associated with the first sandboxed computing environment 420A may be separate from memory that is configured to enable storage and operation of the workspace. The memory associated with the second sandboxed computing environment 420B may be separate from the memory that is configured to enable storage and operation of the workspace. The memory associated with the first sandboxed computing environment 420A may be separate from memory that is configured to enable storage and operation of the second sandboxed computing environment 420B.

In another examples, the memory associated with the first sandboxed computing environment 420A may be allow communication (e.g., direct communication) with memory that is configured to enable storage and operation of the workspace and/or the memory that is configured to enable storage and operation of the second sandboxed computing environment 420B. When the sandbox-based internet isolation system is installed on a mobile device, the system may have a preconfigured allowed list of processes that may implement a set of rules to allow the communication between one or more sandbox computing environments and/or the workspace, and one or more of their applications and/or processes. The sandboxed computing environment may continue to allow the communication until the one or more applications and/or processes are completed. The sandboxed computing environment may be configured to halt (e.g., temporarily halt) the communication and may resume the communication between the one or more of the sandbox computing environments and/or workspace, and the one or more applications and/or processes.

In other examples, the sandbox container process may be configured to provide a firewall interface (e.g., single firewall interface) for one or more (e.g., all) of the sandbox container processes (e.g., internal isolation firewall or internal isolation firewalls associated with the sandboxed applications and/or processes). When the sandbox-based internet isolation system is installed on a mobile device, the system may configure the firewall interface to provide an individual internal isolation firewall policy for the (e.g., each of the) sandboxed computing environments, for example, as a default. The internal isolation firewall may be configured (e.g., further configured) to allow communication (e.g., direct communication) between one or more sandbox computing environments and/or the workspace, and one or more of their applications and/or processes. The internal isolation firewall may be configured to allow communications between one or more sandbox computing environments and/or the workspace, and one or more of their applications and/or processes one at a time. The internal isolation firewall may be configured to allow communications between one or more (e.g., multiple) sandbox computing environments and/or the workspace, and one or more (e.g., multiple) of their applications and/or processes more than one at a time (e.g., simultaneously).

The workspace may include one or more processes operating within the operating system that are not restricted by the first and second sandbox container processes. The operating system of the mobile device may include a set of resources configured to enable operation of the workspace, the first sandbox container process 420A, and/or the second sandbox container process 420B.

The mobile device 412 may enable the host-based firewall. The host-based firewall may prohibit communication (e.g., direct communication) between the mobile device 412 and other devices on the trusted network 430. For example, the host-based firewall may be configured to block incoming traffic to the trusted mobile device 412, except for traffic received via one or more predetermined devices and/or ports. One or more devices (e.g., predetermined devices) on the trusted network 430 may bypass the host-based firewall, for example, using a predetermined set of protocols and/or ports.

The host-based firewall may be implemented using software and/or hardware. For example, the host-based firewall may be implemented using software that is commercially available, for example, such as Symantec Endpoint Protection, MacAfee Host Based Security Systems, etc. The host-based firewall may be implemented using software inherent in the operating system of the mobile device 412, for example the Windows operating system firewall. The host-based firewall may be implemented using software for configuring and/or implementing restrictive ingress and/or egress policies on the mobile device 412.

The installed sandbox-based internet isolation system, when installed at the time of or during manufacturer, seller, and/or supplier, may implement a Basic Input Output System, pre-operating system environment, and/or hardware related security components. For example, the manufacturer, seller, or supplier may enable a secure booting mechanism, a Basic Input Output System and/or pre-operating system environment required password for access, a UEFI required password, a locked and/or limited boot device order, a device access password or security mechanism, and/or any current or future boot loader security mechanisms. A consumer may modify the preconfigured the security components after purchasing the device as required.

The mobile device 412 may enable the first sandboxed computing environment 420A and the second sandboxed computing environment 420B, for example, using the first and second sandbox container processes. The sandbox container processes may be preconfigured if the sandbox-based internet isolation system is installed on a mobile device. For example, the mobile device 412 may be configured to execute one or more programs in the sandbox container processes (e.g., by default) when the sandbox-based internet isolation system is preinstalled on a mobile device. The sandbox container processes may run within the operating system of the mobile device 412. A first memory space may be configured to enable storage and operation of the workspace and configured to execute a first set of one or more applications and/or processes running on the operating system of the mobile device 412. A second memory space, configured to enable storage and operation of a set of one or more applications and/or processes operating within the first sandboxed computing environment 420A, may be prohibited from communicating with other resources within the trusted network 430. A third memory space, configured to enable storage and operation of a set of one or more applications and/or processes operating within the second sandboxed computing environment 420B, may be prohibited from communicating with other resources within the trusted network 430. A browser process 422A (e.g., a sandboxed browser process) may run within the first sandboxed computing environment 420A. The browser process 422A may be configured to enable access to untrusted network destinations. A collaboration software application 422B may run within the second sandboxed computing environment 420B. The collaboration software application 422B may be configured to enable interaction between the mobile device 412 and one or more remote mobile devices (e.g., such as mobile device 462), for example, during a web-based meeting.

Browser solutions running within the workspace of the mobile device 412 may be utilized for communication between the mobile device 412 and trusted network destinations. For example, browser processes running within the workspace of the mobile device 412 may enable access to the trusted network destinations.

The first sandbox container process may segregate the workspace from the first sandboxed computing environment 420A. The first memory space (e.g., the workspace memory) may enable storage and/or operation of the workspace. The operating system may enable operation of the first sandboxed computing environment 420A. The second memory space may enable storage and/or operation of one or more applications and/or processes associated with the first sandboxed computing environment 420A. For example, the second memory space may be reserved for storage and/or operation of the applications and/or processes running within the first sandboxed computing environment 420A. The first sandbox container process may isolate the second memory space from the first memory space and/or any other memory spaces. For example, the first sandbox container process may enable the first internal isolation firewall 418A. The first internal isolation firewall 418A may enforce a separation of the first and second memory spaces. For example, the first internal isolation firewall 418A may allow a predefined set of processes to be executed within the first sandboxed computing environment 420A. The first internal isolation firewall 418A may prevent execution, in the first sandboxed computing environment 420A, of any processes outside of the predefined set of processes. The second memory space may be referred to as a separate and/or isolated memory space. The first sandbox container process may segregate to the second memory space, any additional processes and/or memory usage required for usage of untrusted network destination related content during an established communication session. Separation and/or isolation of computer resources may be referred to as a virtual air gapped solution. The first memory space and the second memory space may be separate physical memory locations. The first memory space and the second memory space may be collocated on a physical memory.

A third memory space may enable storage and/or operation of one or more applications and/or processes associated with the second sandboxed computing environment 420B. For example, the third memory space may be reserved for storage and/or operation of the applications and/or processes running within the second sandboxed computing environment 420B. The second sandbox container process may isolate the third memory space from the first memory space and/or any other memory spaces (e.g., the second memory space). For example, the second sandbox container process may enable the second internal isolation firewall 418B. The second internal isolation firewall 418B may enforce a separation of the first and third memory spaces. For example, the second internal isolation firewall 418B may allow a predefined set of processes to be executed within the second sandboxed computing environment 420B. The second internal isolation firewall 418B may prevent execution, in the second sandboxed computing environment 420B, of any processes outside of the predefined set of processes. The third memory space may be referred to as a separate and/or isolated memory space. The second sandbox container process may segregate to the third memory space, any additional processes and/or memory usage required for interaction with meeting related content (e.g., data) during an established communication session with one or more trusted or untrusted mobile devices. The first, second, and/or third memory spaces may be separate physical memory locations. The first, second, and/or third memory spaces may be collocated on a physical memory.

The second and third memory spaces and the processes therein, may have limited access to the resources, assets, and/or files of the remainder of the computer-accessible data storage or memory space of the mobile device 412. Data transfers between the sandboxed computing environments 420A, 420B and the workspace of the mobile device 412 may be restricted to set transfer types. Data transfers between the sandboxed computing environments 420A, 420B may be restricted to set transfer types. The set transfer types may be configured to minimize the possibility of malicious data migrating between the sandboxed computing environments 420A, 420B and/or from the sandboxed computing environments 420A, 420B to the workspace of the mobile device 412. The sandboxed computing environments 420A, 420B may transfer (e.g., only transfer) data to or from the workspace of the mobile device 412 in response to a user input directing the data transfer. The user input may be an explicit user input such as checking a box and/or selecting a button on an information prompt. The set transfer types that require user input may include one or more manual operations. For example, the set transfer types may include cut or copy of data, paste of data, a printing of data to a local printer, or a file transfer.

The operating system may access (e.g., only access) the second memory space associated with the first sandboxed computing environment 420A and/or the third memory space associated with the second sandboxed computing environment 420B as required for the proper operation of each respective sandboxed computing environment. Each of the internal isolation firewalls 418A, 418B may be built-in with the respective sandboxed computing environments 420A, 420B.

The first sandboxed computing environment 420A, when activated, may enable communication (e.g., indirect communication) between the mobile device 412 and an untrusted network destination via the network-based web proxy 436. The first sandboxed computing environment 420A may be activated via a shortcut and/or one or more predetermined applications on the operating system of the mobile device 412.

As an example, an application shortcut located on the user's desktop space, the desktop toolbar, and/or a standard program screen may be activated, for example, by a user selection. The first sandbox container process may detect when a browser program is selected for activation. When the browser program is activated, the first sandbox container process may terminate one or more running browser program processes and/or may activate the browser process 422A within the first sandboxed computing environment 420A, as described herein.

The browser process 422A, when activated by the first sandbox container process, may initiate a communication session to a proxy device (e.g., the network-based web proxy 436). For example, the communication session may be initiated utilizing an encrypted protocol on a predetermined network port. During the initiation of the communication session, the first sandboxed computing environment 420A may validate the authenticity of a sandbox browser process request for the communication session. The first sandboxed computing environment 420A may authenticate the browser process 422A using an authentication mechanism with the proxy device. If the sandboxed browser process request fails authentication, the communication session may be terminated, for example, by the proxy device.

The first sandbox container process may initiate a communication session with the proxy device using an authentication mechanism. For example, the authentication procedure may use a predetermined protocol and may communicate with the proxy device using a predetermined communication port. As another example, the authentication procedure may be performed dynamically. For example, the authentication procedure used may depend on the network that the mobile device 412 is connected and/or the network that the proxy device is connected. As an example, the first sandbox container process may initiate the browser process 422A and the communication session with the proxy device (e.g., the network-based web proxy 436) using NT LAN Manager (NTLM) protocols and the predetermined network port 2222. As another example, the first sandbox container process may initiate the communication session with the proxy device using a Secure Socket Layer (SSL) and the predetermined network port 2222. As part of the communication session, the first sandboxed computing environment 420A may send validation credentials to the proxy device (e.g., the network-based web proxy 436), for example, using a predetermined authentication mechanism. The predetermined authentication mechanism may be a username/password combination. The username/password combination may be encrypted, for example, with an asymmetric or a symmetric encryption key system. The proxy device (e.g., the network-based web proxy 436) may be the only device able to decrypt the username/password combination.

The first sandbox container process may be configured to authenticate with the proxy device. For example, the first sandbox container process may authenticate with the proxy device on behalf of the browser process 422A. The first sandbox container process may authenticate with the proxy device using credentials stored in a configuration file. The configuration file may be encrypted. For example, the first sandbox container process may be configured to read only encrypted configuration files.

Upon successful creation of a communication session between the first sandboxed computing environment 420A and the proxy device, the proxy device may analyze and/or validate the request to communicate with the untrusted network destination. If the request to communicate with the untrusted network destination is permitted, the proxy device may act as an intermediary communication point between the first sandboxed computing environment 420A and the untrusted network destination.

The second sandboxed computing environment 420B, when activated, may enable communication (e.g., direct or indirect communication) between the mobile device 412 and one or more trusted or untrusted devices via the termination device 440. The communication between the mobile device 412 and another device via the termination device 440 may be established via a peer to peer meeting. The second sandboxed computing environment 420B may be activated via a shortcut, a web browser, and/or one or more predetermined applications on the operating system of the mobile device 412.

As an example, a collaboration software application shortcut located on the user's desktop space, the desktop toolbar, and/or a standard program screen may be activated, for example, by a user selection. As another example, the collaboration software application may be accessed via a web browser and/or a URL address. The second sandbox container process may detect when the collaboration software application 422B is selected for activation. When the collaboration software application 422B is activated, the second sandbox container process may activate the collaboration software application 422B within the second sandboxed computing environment 420B, as described herein.

The collaboration software application 422B, when activated by the second sandbox container process, may initiate a communication session with the termination device 440. For example, the communication session may be initiated utilizing an encrypted protocol on a predetermined network port. During the initiation of the communication session, the second sandboxed computing environment 420B may validate the authenticity of a request for the communication session. The second sandboxed computing environment 420B may authenticate the collaboration software application 422B using an authentication mechanism with the termination device 440. If the request fails authentication, the communication session may be terminated, for example, by the termination device 440.

The second sandbox container process may initiate a communication session with the termination device 440 using an authentication mechanism. The authentication procedure may use a predetermined protocol and may communicate with the termination device 440 using a predetermined communication port. As another example, the authentication procedure may be performed dynamically. For example, the authentication procedure used may depend on the network that the mobile device 412 is connected and/or the network that the termination device 440 is connected. As an example, the second sandbox container process may initiate the collaboration software application 422B and the communication session with the termination device 440 using NT LAN Manager (NTLM) protocols and the predetermined network port 2222. As another example, the second sandbox container process may initiate the communication session with the termination device 440 using a Secure Socket Layer (SSL) and the predetermined network port 2222. As part of the communication session, the second sandboxed computing environment 420B may send validation credentials to the termination device 440, for example, using a predetermined authentication mechanism. The predetermined authentication mechanism may be a username/password combination. The username/password combination may be encrypted, for example, with an asymmetric or a symmetric encryption key system. The termination device 440 may be the only device able to decrypt the username/password combination.

The second sandbox container process may be configured to authenticate with the termination device 440. For example, the second sandbox container process may authenticate with the termination device 440 on behalf of the collaboration software application 422B. The second sandbox container process may authenticate with the termination device 440 using credentials stored in a configuration file. The configuration file may be encrypted. For example, the second sandbox container process may be configured to read only encrypted configuration files.

Upon successful creation of a communication session between the second sandboxed computing environment 420B and the termination device 440, the termination device 440 may analyze and/or validate the request to interact with the one or more trusted or untrusted devices. If the request to interact with the trusted and/or untrusted devices is permitted, the termination device 440 may act as an intermediary communication point between the second sandboxed computing environment 420B and the trusted and/or untrusted devices.

A user may initiate a browser process and may enter and/or select a network destination. The mobile device 412 may initiate the browser process in the workspace or the first sandboxed computing environment 420A. The mobile device 412 may determine whether the network destination is trusted or untrusted. The mobile device 412 may have a preconfigured/predetermined (e.g. at the time of manufacture, sales, and or delivery) list of trusted and untrusted network destinations. The list of trusted and the untrusted network destinations may be configured by the user and/or a program, if necessary. The mobile device 412 may provide access to a trusted network destination via the browser process executed in the workspace. The mobile device 412 may provide access to an untrusted network destination via the browser process 422A executed in the first sandboxed computing environment 420A. For example, the first sandbox container process may be configured to spawn an instance of the browser process 422A in the first sandboxed computing environment 420A to provide access to the untrusted network destination.

As an example, the first sandbox container process may determine that a browser process operating in the workspace is attempting to access an untrusted network destination. The first sandbox container process may spawn an instance of the browser process 422A in the first sandboxed computing environment 420A to provide access to the untrusted network destination. As an example, the first sandbox container process may determine that the browser process operating in the workspace is attempting to access a trusted network destination. The first sandbox container process may allow the browser process operating in the workspace to access the trusted network destination.

As another example, the first sandbox container process may determine that the browser process 422A operating in the first sandboxed computing environment 420A is attempting to access an untrusted network destination. The first sandbox container process may allow the browser process 422A operating in the first sandboxed computing environment 420A to access the untrusted network destination. As another example, the first sandbox container process may determine that the browser process 422A operating in the first sandboxed computing environment 420A is attempting to access a trusted network destination. The first sandbox container process may spawn an instance of a browser process in the workspace to provide access to the trusted network destination.

The first sandboxed computing environment 420A and/or the second sandboxed computing environment 420B may receive malware from an untrusted network device. For example, the untrusted network device may send malware (e.g., malicious software) to the first sandboxed computing environment 420A or the second sandboxed computing environment 420B. The malware may be executed within the respective sandboxed computing environment. The executed malware may start one or more processes, download one or more payloads, and/or execute the one or more payloads. The processes and/or payloads may be executed within the respective sandboxed computing environment, for example, instead of on the workspace of the operating system. The first and/or second sandboxed computing environments 420A, 420B may be considered infected when they have received malware.

Even when the first sandboxed computing environment 420A and/or the second sandboxed computing environment 420B are infected, the use of the sandbox based isolation may allow the mobile device 412 to be considered to be uninfected and trusted. The mobile device 412 may be considered uninfected and trusted because the memory spaces of the first sandboxed computing environment 420A (e.g., the second memory space) and the second sandboxed computing environment 420B (e.g., the third memory space) and the processes operating therein may be separated and isolated from the memory space for the workspace (e.g., the first memory space) of the mobile device 412. The introduced malware may not be able to access the resources, assets, and/or files of the operating system. For example, the first and/or second internal isolation firewalls 418A, 418B may prevent the introduced malware from accessing the resources, assets, and/or files of the operating system. The trusted network 430 (e.g., to which the mobile device 412 is connected) may be deemed to be uninfected and trusted, for example, because the mobile device 412 is considered trusted and uninfected.

A sandboxed computing environment (e.g., such as sandboxed computing environments 420A, 420B) that becomes infected and/or untrusted may encounter problems. The sandbox container process associated with the infected sandboxed computing environment may become inoperable, for example, due to the introduced malware. An infected sandbox container process may restore a pristine copy (e.g., a "clean slate") of the sandboxed computing environment processes and/or its separated and isolated memory space. An infected sandboxed computing environment may be cleared (e.g., immediately) and reverted to its original, trusted condition. For example, one or more (e.g., all) aspects of the introduced malware may be removed from the infected sandboxed computing environment without any harm to the operating system. The sandbox container process may initiate a "clean slate" periodically, e.g., once a day, once every 12 hours, once an hour, etc. The sandbox container process may initiate a "clean slate" on demand, e.g., based on an indication and/or input received from the user of the mobile device 412. The "clean slate" may be initiated using a restore capability of the sandbox container process.

For example, the workspace of the mobile device 412 may include at least one host monitoring process (e.g., such as the process monitoring capability 424B). The at least one host monitoring process may be configured to monitor the first and/or second sandboxed computing environments 420A, 420B and/or the first or second sandbox container processes. The at least one host monitoring process may be configured to restore the sandbox container processes to known good versions. The at least one host monitoring process may be configured to restore the sandbox container processes based on one or more of a user input, an application input, detection of an abnormality in the sandbox container process, or expiration of predetermined period of time (e.g., a timer-based refresh mechanism).

The mobile device 412 (e.g., the process monitoring capability 424B) may be configured to store a restore point of the first and/or second sandboxed computing environments 420A, 420B. The restore point may be associated with a configuration of the respective sandboxed computing environment. The mobile device 412 (e.g., an application or process operating within the workspace) may detect anomalous behavior within the first and/or second sandboxed computing environments 420A, 420B. The mobile device 412 may restore the first and/or second sandboxed computing environments 420A, 420B to the restore point, for example, based on detection of the anomalous behavior.

If malware on an infected sandboxed computing environment is able to access the resources, assets, and/or files of the operating system, the mobile device 412 may be considered infected and untrusted. For example, the malware may bypass the first and/or second internal isolation firewalls 418A, 281B via explicit user input. In an example, the other computer systems connected to the trusted network 430 may also be utilizing similar security and isolation systems as is described with respect to the mobile device 412. Even if one of the computers on the trusted network 430 is infected and transmits malware messages on the trusted network 430, the host-based firewall (e.g., such as the host-based firewall) configured on the other devices connected to the trusted network 430 may prohibit the introduced malware from communicating with/being passed to any other device on the trusted network 430. For example, the host-based firewall may be configured to block incoming traffic from the trusted network 430. For example, the host-based firewall may allow the mobile device 412 to send outgoing messages on the trusted network 430 (e.g., in order to reach certain trusted network locations), but the host-based firewall may be configured to block incoming communications from the other devices connected to the trusted network 430. Thus, when an untrusted mobile device is connected to the trusted network 430, the trusted network 430 may remain uninfected and trusted, for example, even when other devices on the trusted network 430 become infected.

Malware may be introduced to the operating system from a source other than communication with an untrusted network destination. For example, malware may be introduced to the operating system via an infected email, an infected USB memory stick, and/or another infected hardware device.

An infected and/or untrusted mobile device (e.g., regardless of the introduced malware's vector) may have no communication (e.g., direct communication) with the Internet 442. For example, the sandbox container processes may be configured to prevent the processes and applications in the workspace from being allowed to access untrusted resources (e.g., via the Internet 442), which may prevent malware introduced into the workspace from communicating with its source or other devices. Further, the border firewall 438 may prevent the infected and/or untrusted mobile device from communicating with the Internet 442. For example, the border firewall 438 may be configured to block traffic to untrusted sources sent from the mobile device 412 unless the traffic originates from the first or second sandboxed computing environments 420A, 420B (e.g., and is routed through the network-based web proxy 436 or termination device 440, as described herein) and/or is explicitly permitted. Without a connection to (e.g., communication with) the Internet 442, the introduced malware may be prevented from performing many toolset functions from within the workspace as described herein or any other function that an enslaved, infected and/or untrusted mobile device may perform. Without a connection to the Internet 442, the introduced malware may not be able to transfer any data from the infected and/or untrusted mobile device (e.g., the workspace) to the Internet 442.

An electronic mail (email) may be exchanged between the mobile device 412 and the Internet 442. For example, the trusted network 430 may include an intermediary email device (e.g., such as an email server, an email proxy, or the like) (not shown). The email may be sent and/or received by the mobile device 412 using an email application run on the operating system. The intermediary email device may be directly connected to the border firewall 438 and/or located within the trusted network 430.

The exchange of email between the mobile device 412 and the Internet 442 may be accomplished through a web browser application, for example, when the intermediary email device is not included in the trusted network 430. The exchange of email may be accomplished via the first or second sandboxed computing environments 420A, 420B.

When the mobile device 412 is connected to the trusted network 430, the host-based firewall may implement a first configuration. When the mobile device 412 is connected to the untrusted network 432, the host-based firewall may implement a second configuration. The first configuration may be associated with blocking incoming traffic to the mobile device 412 that does not come from one or more predefined devices and/or via one or more predefined ports. In the first configuration, the host-based firewall may allow outgoing traffic to be sent from one or more processes or applications in the workspace, for example irrespective of the type of communication protocol used. In an example, the second configuration may be associated with preventing one or more applications and/or processes operating on the workspace of the mobile device 412 from communicating with one or more untrusted destinations. In an example, the second configuration may be associated with blocking all incoming traffic from the untrusted network 432 to the mobile device 412.

When the host-based firewall is configured in the second configuration, the host-based firewall may allow one or more of the applications and/or process operating within the workspace to communicate with a trusted network destination on condition that a predetermined set of communication protocols. The predetermined set of protocols may include communicating with the trusted network destination via a VPN client associated with the workspace. The trusted network destination may be located on the trusted network 430. The VPN client may be configured to establish an encrypted communication system with the trusted network destination via the untrusted network 432 and/or the Internet 442. For example, the second configuration of the host-based firewall may enable one or more applications and/or processes operating within the workspace to access the trusted network 430 via the untrusted network 432 and/or the Internet 442 using the VPN client.

In this manner, the host-based firewall may allow the processes or applications of the workspace to send outgoing communications without restriction when implementing the first configuration (e.g., when connected to the trusted network), but may limit outgoing communications, when implementing the second configuration (e.g., when connected to the untrusted network), to the processes or applications of the workspace that are destined for trusted destinations and utilize a predetermined protocol in order to communicate with the trusted destination. In both the first and second configurations, the host-based firewall may block incoming communications to the workspace unless the communication is from a trusted destination and uses a predetermined communication protocol.

The mobile device 462 may be configured similarly to the mobile device 412. The mobile device 462 may include a host-based firewall 464 (e.g., such as the host-based firewall), an operating system 476 (e.g., such as the operating system), a first sandboxed computing environment 470A (e.g., such as the first sandboxed computing environment 420A), a second sandboxed computing environment 470B (e.g., such as the second sandboxed computing environment 420B), a first internal isolation firewall 468A (e.g., such as the first internal isolation firewall 418A), a second internal isolation firewall 468B (e.g., such as the second internal isolation firewall 418B), and a workspace 466 (e.g., such as the workspace 426).

The mobile device 462 may include a sandbox-based internet isolation system, for example via installing the internet isolation system on a mobile device at or during the time of manufacturing, sale and/or delivery. For example, the mobile device 462 may include one or more sandboxed computing environments (e.g., such as sandboxed computing environments 470A, 470B). The sandboxed computing environments 470A, 470B may be untrusted portions operating on the mobile device 462. The mobile device 462 may include an anti-virus capability 474A, a process monitoring capability 474B, a document isolation capability 474C, and/or a malware Entrapt capability 474D. For example, the sandbox-based internet isolations system may include the anti-virus capability 474A, the process monitoring capability 474B, the document isolation capability 474C, and the malware Entrapt capability 474D. The sandbox-based internet isolations system may be installed on a mobile device at or during the time of manufacture, sales and/or delivery. The sandbox-based internet isolations system may be available in a single application and/or application suite after purchasing a mobile device.

The mobile device 462 may be configured to connect to the untrusted network 432. The mobile device 462 may be configured to access the trusted network 430, for example, via the untrusted network 432 and/or the Internet 442. For example, the mobile device 462 may access the trusted network 430 via a VPN connection. The VPN connection may enable the connectivity and features associated with a direct connection to the trusted network 430. The mobile device 462 may be configured to locally connect to the trusted network 430.

When the mobile device 462 is remotely connected to the trusted network 430, the first and/or second sandboxed computing environments 470A, 470B may be configured to send web traffic to untrusted network destinations via a web proxy. For example, when the mobile device 462 is connected to an untrusted network 432, the first and/or second sandboxed computing environments 470A, 470B may send the web traffic to the first internet-based web proxy 446 and/or the second internet-based web proxy 448. As an example, the first and/or second sandboxed computing environments 470A, 470B may be configured to use the same internet-based web proxy (e.g., such as the first internet-based web proxy 446) when the mobile device 462 is connected to the trusted network 430 or the untrusted network 432. As another example, the first and/or second sandboxed computing environments 470A, 470B may be configured to use the first internet-based web proxy 446 when the mobile device 462 is connected to a trusted network (e.g., such as trusted network 430) and may be configured to use the second internet-based web proxy 448 when the mobile device 462 is connected to an untrusted network (e.g., such as untrusted network 432). As another example, the first and/or second sandboxed computing environments 470A, 470B may be configured to use the first internet-based web proxy 446 and/or a network-based web proxy (e.g., such as the network-based web proxy 436) when the mobile device 462 is connected to a trusted network (e.g., such as the trusted network 430) and may be configured to use the second internet-based web proxy 448 when the mobile device 462 is connected to an untrusted network (e.g., such as the untrusted network 432). As another example, the first and/or second sandbox computing environments 470A, 470B may be configured to use the network-based web proxy (e.g., such as the network-based web proxy 436) when the mobile device 462 is connected to an untrusted network (e.g., such as the untrusted network 432) with an encrypted connection channel (e.g., a VPN connection) to a trusted network (e.g., the trusted network 430) and may be configured to use one or more of the internet-based web proxies 446, 448 when connected to an untrusted network (e.g., such as the untrusted network 432) without an encrypted connection channel to a trusted network (e.g., trusted network 430).

The terms used herein should be seen to be terms of description rather than of limitation. It is understood that those of skill in the art with this disclosure may devise alternatives, modifications, or variations of the principles of the invention. It is intended that all such alternatives, modifications, or variations be considered as within the spirit and scope of this invention, as defined by the following claims.

Embodiments may take the form of a tangible computer-usable or computer-readable medium providing program code for use by or in connection with a computer or any instruction execution system. Examples of a computer-usable or computer-readable medium include tangible computer media such as semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. A processor may be configured to execute instructions stored in memory to perform the various functions and/or functional modules described herein.

What is claimed:

1. A mobile device comprising a processor and a memory, the processor configured to:
   implement a workspace, wherein the workspace is configured to enable operation of a first set of one or more applications via a first memory space;
   select at least one authentication device based on an identity of a network;
   implement an isolated computing environment, the isolated computing environment comprising a sandboxed computing environment and being configured to enable operation of a second set of one or more applications or processes via a second memory space, wherein the second set of one or more applications or processes is configured to authenticate with the at least one authentication device to communicate with one or more untrusted network destinations;
   isolate the isolated computing environment from the workspace using an internal isolation firewall; and
   isolate the workspace and the isolated computing environment from at least one network using a host-based firewall.

2. The mobile device of claim 1, wherein the network corresponds to one or more of a local area network (LAN), a wide area network (WAN), a cellular network, a Wi-Fi network, a digital subscribers line (DSL) network, a cloud computing network, a data center, or a satellite network.

3. The mobile device of claim 1, wherein the host-based firewall is configured to one or more of: allow one or more incoming communications from the network that are sent to the isolated computing environment or block one or more incoming communications from the network that are sent to the workspace.

4. The mobile device of claim 1, wherein the processor is further configured to run one or more trusted applications in the workspace, and wherein the host-based firewall is configured to allow the trusted applications to communicate with one or more destinations via the network based on determining that the destinations are trusted destinations.

5. The mobile device of claim 1, wherein the second set of one or more applications or processes are configured to communicate via at least one proxy server in order to communicate with the untrusted network destinations, and wherein the processor is configured to select the at least one proxy server based on the identity of the network.

6. The mobile device of claim 1, wherein the isolated computing environment and the workspace are configured on the mobile device during manufacturing, sale, or prior to delivery of the mobile device.

7. The mobile device of claim 1, wherein the processor is further configured to prompt a user of the mobile device to select whether to execute a downloaded application in the first memory space or the second memory space.

8. The mobile device of claim 1, wherein the isolated computing environment comprises a first sandboxed computing environment and a second sandboxed computing environment, wherein the first sandboxed computing environment and the second sandboxed computing environment are each configured to run a subset of the second set of one or more applications or processes, and wherein the processor is further configured to prompt a user of the mobile device to select whether to run an application in the first sandboxed computing environment or the second sandboxed computing environment.

9. The mobile device of claim 8, wherein the internal isolation firewall is configured to prompt the user of the mobile device to allow communication between the first sandboxed computing environment and the second sandboxed computing environment.

10. The mobile device of claim 1, wherein the internal isolation firewall is configured to prompt a user of the mobile device to allow communication between the workspace and the isolated computing environment.

11. The mobile device of claim 1, wherein the memory comprises two or more memory chips, and wherein the first memory space and the second memory space are located on separate memory chips.

12. The mobile device of claim 1, wherein the second set of one or more applications comprises at least one of an Internet browser, an email application, a document editing application, or a social media application.

13. A method comprising:
   implementing a workspace, wherein the workspace is configured to enable operation of a first set of one or more applications via a first memory space;
   selecting at least one authentication device based on an identity of a network;
   implementing an isolated computing environment, the isolated computing environment comprising a sandboxed computing environment and being configured to enable operation of a second set of one or more applications or processes via a second memory space, wherein the second set of one or more applications or processes is configured to authenticate with the at least one authentication device to communicate with one or more untrusted network destinations;
   isolating the isolated computing environment from the workspace using an internal isolation firewall; and
   isolating the workspace and the isolated computing environment from at least one network using a host-based firewall.

14. The method of claim 13, wherein the host-based firewall is configured to one or more of: allow one or more incoming communications from the network that are sent to the isolated computing environment or block one or more incoming communications from the network that are sent to the workspace.

15. The method of claim 13, further comprising running one or more trusted applications in the workspace, wherein the host-based firewall is configured to allow the trusted applications to communicate with one or more destinations via the network based on determining that the destinations are trusted destinations.

16. The method of claim 13, wherein the second set of one or more applications or processes are configured to communicate via at least one proxy server in order to communicate with the untrusted network destinations, and further comprising selecting the at least one proxy server based on the identity of the network.

17. The method of claim 13, wherein the isolated computing environment comprises a first sandboxed computing environment and a second sandboxed computing environment, wherein the first sandboxed computing environment and the second sandboxed computing environment are each configured to run a subset of the second set of one or more applications or processes, and further comprising prompting a user to select whether to run an application in the first sandboxed computing environment or the second sandboxed computing environment.

18. The method of claim 17, wherein the internal isolation firewall is configured to prompt the user to allow communication between the first sandboxed computing environment and the second sandboxed computing environment.

19. The method of claim 13, further comprising prompting a user to select whether to execute a downloaded application in the first memory space or the second memory space.

20. The method of claim 13, wherein the internal isolation firewall is configured to prompt a user to allow communication between the workspace and the isolated computing environment.

* * * * *